(12) United States Patent
Muramatsu et al.

(10) Patent No.: US 7,636,282 B2
(45) Date of Patent: Dec. 22, 2009

(54) INFORMATION RECORDING APPARATUS AND METHOD, AND INFORMATION RECORDING MEDIUM

(75) Inventors: Eiji Muramatsu, Saitama (JP); Shoji Taniguchi, Saitama (JP); Kunihiko Horikawa, Saitama (JP); Masahiro Kato, Saitama (JP); Toshio Suzuki, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 701 days.

(21) Appl. No.: 10/573,762

(22) PCT Filed: Sep. 29, 2004

(86) PCT No.: PCT/JP2004/014229

§ 371 (c)(1),
(2), (4) Date: Jun. 23, 2006

(87) PCT Pub. No.: WO2005/031718

PCT Pub. Date: Apr. 7, 2005

(65) Prior Publication Data

US 2006/0285457 A1    Dec. 21, 2006

(30) Foreign Application Priority Data

Sep. 30, 2003    (JP) ............................. 2003-340556

(51) Int. Cl.
*G11B 15/52* (2006.01)

(52) U.S. Cl. ............... 369/47.51; 369/53.26; 369/275.3
(58) Field of Classification Search ................. None
See application file for complete search history.

(56) References Cited

U.S. PATENT DOCUMENTS

| 2002/0126602 | A1 | 9/2002 | Van Woudenberg |
| 2003/0137915 | A1 | 7/2003 | Shoji et al. |
| 2003/0223351 | A1* | 12/2003 | Aoshima et al. ............ 369/288 |

FOREIGN PATENT DOCUMENTS

| EP | 1 244 096 | 9/2002 |
| EP | 1 318 509 | 6/2003 |
| EP | 1 331 631 | 7/2003 |
| JP | 2000-293947 | 10/2000 |
| JP | 2003-22532 | 1/2003 |
| JP | 2004-171740 | 6/2004 |

* cited by examiner

*Primary Examiner*—Paul Huber
(74) *Attorney, Agent, or Firm*—Young & Thompson

(57) ABSTRACT

An information recording apparatus for recording information onto an information recording medium having a plurality of recording layers, by irradiating the information recording medium with laser light for recording, the information recording apparatus including: a setting device for setting a preferable irradiation condition of the laser light which is preferable to one recording layer in which the information is scheduled to be recorded, out of the plurality of recording layers, for each recording state of another recording layer out of the plurality of recording layers; and an irradiating device for irradiating the one recording layer with the laser light in the set preferable irradiation condition.

9 Claims, 14 Drawing Sheets

FIG. 4

(for L1 layer)

| Field ID | Contents | Location |
|---|---|---|
| ID 0 | ECC block address | all the recording areas |
| ID 1 | Extended information, etc. | Lead-in area |
| ID 2 | Strategy information for 1X (L0 unrecorded) | Lead-in area |
| ID 3 | Production identification number | Lead-in area |
| ID 4 | Production identification number | Lead-in area |
| ID 5 | Strategy information for 1X (L0 recorded) | Lead-in area |
| ID 6 | Strategy information for 2X (L0 unrecorded) | Lead-in area |
| ID 7 | Strategy information for 2X (L0 recorded) | Lead-in area |
| ID 8 | Strategy information for 4X (L0 unrecorded) | Lead-in area |
| ID 9 | Strategy information for 4X (L0 unrecorded) | Lead-in area |
| ID 10 | Strategy information for 4X (L0 unrecorded) | Lead-in area |
| ID 11 | Strategy information for 4X (L0 recorded) | Lead-in area |
| ID 12 | Strategy information for 4X (L0 recorded) | Lead-in area |
| ID 13 | Strategy information for 4X (L0 recorded) | Lead-in area |

FIG. 5

(for L1 layer)

| Field ID | Location | ECC block address |
|---|---|---|
| Field ID1 | Start of the Lead-in area | FF DD05h |
| Field ID2 | | |
| Field ID3 | | |
| Field ID4 | | |
| Field ID5 | | . |
| Field ID6 | | . |
| Field ID7 | | . |
| Field ID8 | | . |
| Field ID9 | | . |
| Field ID10 | | . |
| Field ID11 | | |
| Field ID12 | | |
| Field ID13 | | |
| Field ID1 | | |
| . | | |
| . | | |
| Field ID12 | | |
| Field ID13 | | |
| Field ID0 | | FF D003h |
| Field ID0 | | FF D002h |
| Field ID0 | | FF D001h |
| Field ID0 | End of the Lead-in area | FF D000h |
| Field ID0 | | FF CFFFh |

INFORMATION RECORDING APPARATUS AND METHOD, AND INFORMATION RECORDING MEDIUM

This application is a 371 of PCT/JP04/14229, filed Sep. 29, 2004.

TECHNICAL FIELD

The present invention relates to an information recording apparatus, such as a DVD recorder, an information recording method, and an information recording medium, such as a DVD.

BACKGROUND ART

This type of information recording apparatus is constructed to record information by laser light for recording with a pulse width, pulse intensity, a pulse shape, recording strategy, or the like which are preferable (referred to as a "preferable irradiation condition" in this application as occasion demands) in accordance with the recording layer of the information recording medium, such as an optical disc.

Here, as described in a patent document 1 or the like, there is also developed an information recording medium, such as a multiple layer or multilayer type, or dual layer type optical disc, in which a plurality of recording layers are stacked or laminated on the same substrate. The information recording apparatus firstly performs the recording with respect to a recording layer located on the top, and secondly performs the recording with respect to a recording layer located on the second top, in the preferable irradiation condition defined for such a multilayer type information recording medium.

Patent document 1: Japanese Patent Application Laying Open NO. 2000-311346

DISCLOSURE OF INVENTION

Object to be Solved by the Invention

However, if the recording is performed on the above-mentioned multilayer type information recording medium, the laser light reaches the other recording layers other than one recording layer located on the front as viewed from the irradiation side of the laser light, through at least one recording layer, and a semitransparent reflective film, an adhesive film, or a middle film, or the like accompanied by the one recording layer. Moreover, the light reflected here is also detected by an optical pickup through the one recording layer or the like. Thus, in the other recording layers, light transmittance, amount of residual aberration, layer damage, or the like varies depending on whether or not the information is recorded in at least one recording layer located on the closer side than the other recording layers, i.e., depending on whether or not there is a recording mark in an optical path by phase change recording or irreversible change recording by heat or the like. Therefore, the preferable irradiation condition with respect to the other recording layers depends on the recording condition of at least one recording layer located on the closer side than the other recording layers. As described above, in the case where there is a difference in the preferable irradiation condition of each recording layer due to the recording condition in the other recording layers, if the preferable irradiation condition, such as an optimum recording pulse width, is defined for each information recording medium or for each recording layer, as described in the above-mentioned Background Art, the irradiation condition of the laser light is not always optimum nor preferable, which is a technical problem. Moreover, there can be considered such an application or specification that it is advantageous if a recording layer on the upper layer side and a recording layer on the lower layer side positively have a difference in the preferable irradiation condition. Even in this case, if the preferable irradiation condition, such as an optimum recording pulse width, is defined for each information recording medium, as in the above-mentioned Background Art, the irradiation condition of the laser light is not always optimum nor preferable.

In order to solve the above-mentioned conventional problem, it is therefore an object of the present invention to provide an information recording apparatus and an information recording method which can record information while maintaining an appropriate irradiation condition of laser light for recording, in each recording layer of a multilayer type information recoding medium, for example, as well as the multilayer type information recording medium.

Means for Solving the Object

In order to solve the above-mentioned object, an information recording apparatus according to claim 1 of the present invention is an information recording apparatus for recording information onto an information recording medium provided with a plurality of recording layers, by irradiating the information recording medium with laser light for recording, the information recording apparatus provided with: a setting device for setting a preferable irradiation condition of the laser light which is preferable to one recording layer in which the information is scheduled to be recorded, out of the plurality of recording layers, for each recording state of another recording layer out of the plurality of recording layers; and an irradiating device for irradiating the one recording layer with the laser light in the set preferable irradiation condition.

In order to solve the above-mentioned object, an information recording method according to claim 13 of the present invention is an information recording method of recording information onto an information recording medium provided with a plurality of recording layers, by irradiating the information recording medium with laser light for recording, the information recording method provided with: a setting process of setting a preferable irradiation condition of the laser light which is preferable to one recording layer in which the information is scheduled to be recorded, out of the plurality of recording layers, for each recording state of another recording layer out of the plurality of recording layers; and an irradiating process of irradiating the one recording layer with the laser light in the set preferable irradiation condition.

In order to solve the above-mentioned object, an information recording medium according to claim 14 of the present invention is an information recording medium provided with a plurality of recording layers to record therein information by irradiating the information recording medium with laser light for recording, wherein at least one of the plurality of recording layers has a management information area in which preferable irradiation condition information is recorded, in which the preferable irradiation condition information is to define a preferable irradiation condition of the laser light which is preferable to one recording layer in which the information is scheduled to be recorded, out of the plurality of recording layers, for each recording state of another recording layer out of the plurality of recording layers.

In order to solve the above-mentioned object, an information recording medium according to claim 15 of the present invention is An information recording medium, provided with a plurality of recording layers to record therein information by irradiating the information recording medium with laser light for recording, and having a first test writing area in which the information is recorded in another recording layer out of the plurality of recording layers and a second test writing area in which the information is not recorded in the another recording layer, in order to obtain a preferable irradiation condition of the laser light which is preferable to one recording layer in which the information is scheduled to be recorded, out of the plurality of recording layers.

These effects and other advantages of the present invention become more apparent from the following embodiments and example.

BRIEF DESCRIPTION OF DRAWINGS

FIG. 1 shows the basic structure of an optical disc according to an example of the information recording medium of the present invention, wherein the upper part is a substantial plan view showing the optical disc having a plurality of areas and the corresponding lower part is a schematic conceptual view showing a recording area structure in the radial direction.

FIG. 2 is a partially enlarged perspective view showing a recording surface of the optical disc according to the example of the information recording medium of the present invention.

FIG. 3 is a data structural view conceptually showing an example of the data structure of the optical disc according to the example of the information recording medium of the present invention.

[FIG. 4] FIG. 4 is a table showing the classification of data of land pre-pits recorded in a lead-in area in an L1 layer of the optical disc according to the example of the information recording medium of the present invention.

[FIG. 5] FIG. 5 is a table showing the arrangement and the ECC block address in the lead-in area of the land pre-pits in the L1 layer of the optical disc according to the example of the information recording medium of the present invention.

FIG. 6 is a schematic conceptual view showing a relationship between laser light for recording and the optical disc in the case where an L0 layer is unrecorded on the optical disc according to a first example of the information recording apparatus of the present invention.

FIG. 7 is a schematic conceptual view showing the relationship between the laser light for recording and the optical disc in the case where the L0 layer is recorded on the optical disc according to the first example of the information recording apparatus of the present invention.

FIG. 8 is a graph showing a recording pulse characterized by pulse intensity which is one specific example of a preferable irradiation condition according to the first example of the information recording apparatus of the present invention.

FIG. 9 is a graph showing a recording pulse characterized by a pulse width which is another specific example of the preferable irradiation condition according to the first example of the information recording apparatus of the present invention.

FIG. 10 is a graph showing a recording pulse characterized by the pulse intensity and the pulse width which are another specific example of the preferable irradiation condition according to the first example of the information recording apparatus of the present invention.

FIG. 11 is a schematic conceptual view showing the relationship between the laser light for recording and the optical disc in the case where the L0 layer is unrecorded on the optical disc according to a second example of the information recording apparatus of the present invention.

FIG. 12 is a schematic conceptual view showing the relationship between the laser light for recording and the optical disc in the case where the L0 layer is recorded on the optical disc according to the second example of the information recording apparatus of the present invention.

FIG. 13 is a block diagram showing an information recording/reproducing apparatus in an example of the information recording apparatus of the present invention.

FIG. 14 is a flowchart showing a recording operation of the optical disc in the example of the information recording apparatus of the present invention.

DESCRIPTION OF REFERENCE CODES

Figure 1:
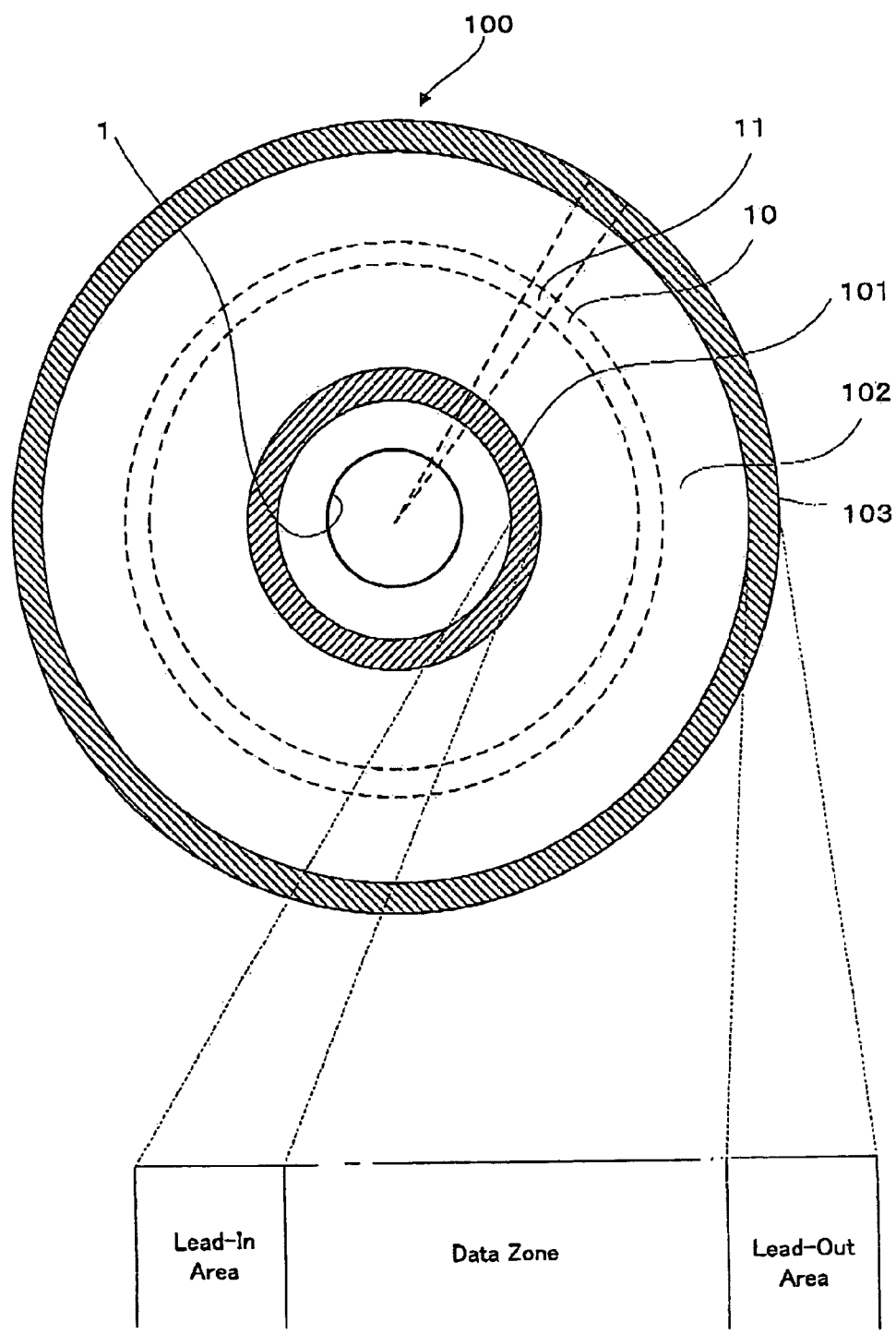
[FIG. 1]

1 Center hole
10 Track
11 ECC block
100 Optical disc
101-0 (101-1) Lead-in area
101A-0 (101A-1) OPC area
101B-0 (101B-1) Management information recording area
101C-0 (101C-1) Preferable information upon not-recording
102-0 (102-1) Data zone
103-0 (102-1) Lead-out area
106 Transparent substrate
107 First recording layer
109 Wobble
108 Semitransparent reflective film
205 Middle layer
207 Second recording layer
208 Reflective film
300 Information recording/reproducing apparatus
306 Data input/output control device
307 Operation control device
310 Operation button
311 Display panel
351 Spindle motor
352 Optical pickup
353 Signal recording/reproducing device
354 CPU (drive control device)
355 Memory
GT Groove track
LT Land track
LB Laser light
LP Land pre-pit
Lw1 First recording pulse
Lw2 Second recording pulse
Tc1 Time interval of cooling pulse
Tmp Time interval of multi pulse
Ttop Time interval of top pulse

BEST MODE FOR CARRYING OUT THE INVENTION (Embodiment of Information Recording Apparatus)

The information recording apparatus according to an embodiment of the present invention will be explained.

The embodiment of the information recording apparatus of the present invention is an information recording apparatus for recording information onto an information recording medium provided with a plurality of recording layers, by irradiating the information recording medium with laser light for recording, the information recording apparatus provided with: a setting device for setting a preferable irradiation condition of the laser light which is preferable to one recording layer in which the information is scheduled to be recorded, out of the plurality of recording layers, for each recording state of another recording layer out of the plurality of recording layers; and an irradiating device for irradiating the one recording layer with the laser light in the set preferable irradiation condition.

According to the information recording apparatus of the present invention, the information is recorded onto the multilayer type information recording medium in which the plurality of recording layers are stacked or laminated on one side of a substrate, such as a multilayer or dual layer or multiple layer type optical disc, by irradiating the information recording medium with the laser light. Particularly in the embodiment, by the setting device including a CPU (Central Processing Unit) or the like, for example, the preferable irradiation condition of the laser light which is preferable to one recording layer in which the information is scheduled to be recorded (e.g. an L1 layer described later) is set for each recording state of another recording layer or another recording layers (e.g. an L0 layer described later). Here, the expression, "for each recording state", means in accordance with in which recording state it is, out of a plurality of recording states whose presence is premised in one or a plurality of recording layers, including a recorded state, an unrecorded state, a partially recorded state, a partially unrecorded state or the like. Typically, the expression means for each difference of whether it is unrecorded or recorded. For example, in one recording layer, there are two combinations of whether to be recorded or unrecorded. More generally, in n pieces of recording layers (n is a natural number of 2 or more), there are the n-th power of two pieces of combinations of whether to be unrecorded or recorded. After that, by the irradiating device including a semiconductor laser or the like, the one recording layer (e.g. the L1 layer) is irradiated with the laser light, in the preferable irradiation condition set in the above manner. At this time, the irradiating device modulates the laser light in accordance with the information to be recorded. For example, the irradiating device performs pulse width modulation, pulse intensity modulation, or the like. At this time, recording strategy is also preferably optimized.

Particularly, here, if another recording layer is located on the front of one recording layer, as viewed from the irradiation side of the laser light (e.g. in the case that the another recording layer is the L0 layer), light transmittance and the amount of residual aberration in the recording of the one recording layer varies in each recording state of the another recording layer. Alternatively, if another recording layer is located on the rear of one recording layer, as viewed from the irradiation side of the laser light (e.g. in the case that the another recording layer is the L1 layer or an L2 layer, etc.), an influence of layer damage or the like varies in each recording state of the another recording layer. Therefore, in any cases, the preferable irradiation condition related to the laser light for recording, such as the pulse width, the pulse intensity, the pulse shape, and the recording strategy, generally varies depending on each recording state of the another recording layer.

However, in the embodiment, the preferable irradiation condition is set by the setting device for each recording state of another recording layer, as described above, so that it is possible to individually set the preferable irradiation condition of the laser light even in any recording state of another recording layer. The embodiment is different from the above-mentioned background art in which the preferable irradiation condition is uniquely defined regardless of the recording state of another recording state, therefore owing to the embodiment, if another recording layer is in a certain recording state, the information can be recorded with an extremely notable difference and in a good condition.

As described above, according to the embodiment, it is possible to irradiate the laser light in the preferable irradiation condition, regardless of the recording state, which is recorded or unrecorded or the like, of another recording layer, such as the recording layer located on the front as viewed from the irradiation side of the laser light. By this, it is possible to record the information in a good condition, onto the multilayer type information recording medium, regardless of its recording state.

Incidentally, normally, the information is recorded into a recording area with a certain areal (or area) size in all the recording areas. Thus, the preferable irradiation condition may be changed in accordance with the recording state, which is recorded or unrecorded or the like, of another recording layer, during the recording. In other word, in recording the information, the preferable irradiation condition may be changed by the setting device, as occasion demands. On the other hand, the information is recorded into a partial recording area in all the recording areas. Thus, a judgment of whether another recording layer is recorded or unrecorded may be performed during the recording or frequently, and as a result, the preferable irradiation condition may be changed during the recording or frequently.

In one aspect of the embodiment of the information recording apparatus of the present invention, the setting device sets at least one of a pulse width, pulse intensity, a pulse shape, and recording strategy of the laser light, which are preferable to the one recording layer.

According to this aspect, at least one of the pulse width, the pulse intensity, the pulse shape, and the recording strategy, which are preferable to the one recording layer, is set by the setting device, for each recording state of another recording layer. Therefore, it is possible to record the information in a good condition by using the laser light, onto the multilayer type information recording medium, regardless of its recording state.

In another aspect of the embodiment of the information recording apparatus of the present invention, the information recording apparatus is further provided with a judging device for judging a difference of whether the another recording layer is unrecorded or recorded, as for each recording state, and the setting device sets the preferable irradiation condition, in accordance with a judgment result by the judging device.

According to this aspect, if the information is recorded, at first, the difference of whether the another recording layer is unrecorded or recorded is judged by the judging device including a CPU, an optical pickup or the like, for example. Then, in accordance with the judgment result, the preferable irradiation condition is set by the setting device. Therefore, in performing the recording with respect to one recording layer, it is possible to certainly judge the difference of the recording state in another recording layer, and further, on the basis of this, it is possible to perform the recording by using the laser light in the preferable irradiation condition which is preferable to the one recording layer.

In an aspect associated with the judging device, the judging device may judge the difference of whether or not the another recording layer is unrecorded or recorded, by each predetermined area unit, by collectively scanning recording areas in the another recording layer, before the information is recorded into the one recording layer.

By such construction, the recording areas of another recording layer are collectively scanned by the judging device, and the difference of whether the another recording layer is unrecorded or recorded is judged by each predetermined area unit. For example, a plurality of points which are spread in all the recording areas are accessed, and the difference of whether or not the another recording layer is unrecorded or recorded is judged at each of the accessed points. In this case, the "area unit" is preferably a size determined according to the amount of information to be recorded in the following series of recording operation or operations. Alternatively, in view of frequency of performing such a judgment operation by the judging device, it may be equal to or greater than, or equal to or less than the size according to the amount of the information to be recorded. With respect to the judgment of whether to be unrecorded or recorded in each area unit, for example, a ratio between an unrecorded areal (or area) size and a recorded areal size, a ratio between the number of unrecorded tracks and the number of recorded tracks, or the like is detected, and this ratio or these ratios are compared with a predetermined reference (predetermined threshold value), to thereby judge it is "(to be treated as) unrecorded" or "(to be treated as) recorded". The predetermined threshold value in this case may be variably set in accordance with an interlayer distance between one recording layer and another recording layer.

Incidentally, in the case of a DVD-R, for example, the information is written in order from the inner circumferential side of the disc in the recording area, so that an unrecorded area can be easily specified.

In an aspect associated with the judging device, the judging device may judge the difference of whether or not the another recording layer is unrecorded or recorded, by referring to table information which indicates the difference of whether or not the another recording layer is unrecorded or recorded, by each predetermined area unit in recording areas in the another recording layer.

By such construction, a table is referred to by the judging device, and the difference of whether the another recording layer is unrecorded or recorded is judged, easily and quickly, by each predetermined area unit. Such a table may be stored in a storage apparatus mounted on the information recording apparatus side, or may be recorded in a management information area of the information recording medium side.

In another aspect of the embodiment of the information recording apparatus of the present invention, at least one of the plurality of recording layers has a management information area in which preferable irradiation condition information for defining the preferable irradiation condition for each recording state of the another recording layer, is recorded, the information recording apparatus is further provided with a first reading device for reading the preferable irradiation condition information from the management information area, and the setting device sets the preferable irradiation condition on the basis of the read preferable irradiation condition information.

According to this aspect, in at least one of the plurality of recording layers, the preferable irradiation condition information is recorded in the management information area which is in or near a lead-in area, for example. Such preferable irradiation condition information may be recorded as pre-format information, such as a pre-pit, in advance, or may be recorded as the preferable irradiation condition information which is separately generated through the setting operation performed by the setting device. Upon the operation of the information recording apparatus, at first, the preferable irradiation condition information is read from the management information area by the reading device including an optical pickup or the like, for example. Then, the preferable irradiation condition is set by the setting device, on the basis of the read preferable irradiation condition information.

Alternatively, in another aspect of the embodiment of the information recording apparatus of the present invention, the information recording apparatus is further provided with: a test-writing controlling device for controlling the irradiating device to test-write data for test writing into the one recording layer, in both (i) an unrecorded area in which the another recording layer is unrecorded and (ii) a recorded area in which the another recording layer is recorded; and a second reading device for reading the data for test writing, from the one recording layer in both the unrecorded area and the recorded area in which the test writing is performed, and the setting device sets the preferable irradiation condition, on the basis of the read data for test writing.

According to this aspect, before the information is recorded in one recording layer, the data for test writing is test-written into the one recording layer, in both the unrecorded area and the recorded area in another recording layer, under the control of the test-writing controlling device. For example, so-called OPC (Optimum Power Calibration) or the like is performed. After that, the data for test writing is read by the reading device from the one recording layer in the unrecorded area and the recorded area in which the test writing has been performed. Then, the preferable irradiation condition is set by the setting device on the basis of the read data for test writing. Therefore, it is possible to set the preferable irradiation condition which reflects the actual state of the recording layer in real time, on the basis of the data for test writing.

In this aspect, the information recording apparatus may be further provided with a first storing device for storing preferable irradiation condition information which indicates the preferable irradiation condition set by the setting device.

By such construction, the preferable irradiation condition information, obtained by using the test writing process which requires a relatively long time and a relatively heavy processing load, is maintained on the information recording apparatus side, to thereby allow the effective use thereof.

However, the preferable irradiation condition information set by using the test writing process as described above may be also recorded in the management information area of the information recording medium, as described above.

Alternatively, in another aspect of the embodiment of the information recording apparatus of the present invention, at least one of the plurality of recording layers has a management information area in which preferable irradiation condition information for defining the preferable irradiation condition in only one of (i) a case where the another recording layer is unrecorded and (ii) a case where the another recording layer is recorded, is recorded, the information recording apparatus is further provided with a third reading device for reading the preferable irradiation condition information from the management information area, and the setting device sets the preferable irradiation condition on the basis of the read preferable irradiation condition information in the one case, and sets the preferable irradiation condition on the basis of (I) the read preferable irradiation condition information and (II) relationship information which indicates a relative relationship between a preferable irradiation defined for the other case and a preferable irradiation condition defined for the one case, in the other case out of the unrecorded case and the recorded case.

According to this aspect, in at least one of the plurality of recording layers, the preferable irradiation condition information is recorded in the management information area which is in or near a lead-in area, for example. Such preferable irradiation condition information is defined in only one of (i) the case where the another recording layer is unrecorded and (ii) the case where the another recording layer is recorded. Upon the operation of the information recording apparatus, at first, the preferable irradiation condition information is read from the management information area by the reading device including an optical pickup or the like, for example. Then, the preferable irradiation condition is set by the setting device, on the basis of the read preferable irradiation condition information and the relationship information.

In an aspect associated with the relationship information, the preferable irradiation condition may be expressed as a predetermined parameter value related to the laser light, and the relationship information may include information which indicates a ratio or difference of the predetermined parameter value in the other case, with respect to the predetermined parameter value in the one case.

By such construction, for example, as one example of the predetermined parameter value, if the pulse width of the laser light is D1 in the case where the another recording layer is unrecorded and the pulse width of the laser light is D2 in the case where the another recording layer is recorded, the relationship information is information which represents a ratio c=D2/D1 and a difference .=D2.D1. Then, even if the pulse width D2 of the laser light which is the preferable irradiation condition in the case where the another recording layer is recorded, is unknown, it can be set, like D2=c×D1, D2=D1+., or the like.

In an aspect associated with the relationship information, the relationship information may be recorded in the management information area together with the preferable irradiation condition information.

By such construction, when the information is recorded into one recording layer, at first, by reading the preferable irradiation condition information and the relationship information from the management information area, it is possible to set the preferable irradiation condition, easily and quickly, whether the another recording layer is unrecorded or recorded.

In an aspect associated with the relationship information, the information recording apparatus may be further provided with a second storing device for storing the relationship information, and the setting device may set the preferable irradiation condition, on the basis of the read preferable irradiation condition information and the relationship information stored in the second storing device, in the other case.

By such construction, when the information is recorded into one recording layer, at first, by virtue of the preferable irradiation condition information read from the management information area and the relationship information read from the storing device, it is possible to set the preferable irradiation condition, easily and quickly, whether the another recording layer is unrecorded or recorded.

(Embodiment of Information Recording Method)

Next, the information recording method according to an embodiment of the present invention will be explained.

The embodiment of the information recording method of the present invention is an information recording method of recording information onto an information recording medium provided with a plurality of recording layers, by irradiating the information recording medium with laser light for recording, the information recording method provided with: a setting process of setting a preferable irradiation condition of the laser light which is preferable to one recording layer in which the information is scheduled to be recorded, out of the plurality of recording layers, for each recording state of another recording layer out of the plurality of recording layers; and an irradiating process of irradiating the one recording layer with the laser light in the set preferable irradiation condition.

According to the embodiment of the information recording method of the present invention, as in the case of the above-mentioned information recording apparatus of the present invention, it is possible to irradiate the laser light in the preferable irradiation condition, regardless of the recording state, which is recorded or unrecorded or the like, of another recording layer, such as the recording layer located on the front as viewed from the irradiation side of the laser light. By this, it is possible to record the information in a good condition, onto the multilayer type information recording medium, regardless of its recording state.

(Embodiments of Information Recording Medium)

Next, the information recording medium according to embodiments of the present invention will be explained.

A first embodiment of the information recording medium of the present invention is an information recording medium provided with a plurality of recording layers to record therein information by irradiating the information recording medium with laser light for recording, wherein at least one of the plurality of recording layers has a management information area in which preferable irradiation condition information is recorded, in which the preferable irradiation condition information is to define a preferable irradiation condition of the laser light which is preferable to one recording layer in which the information is scheduled to be recorded, out of the plurality of recording layers, for each recording state of another recording layer out of the plurality of recording layers.

According to the first embodiment of the information recording medium of the present invention, at least one of the plurality of recording layers, which are stacked or laminated on one side of a substrate, i.e., which constitute the multilayer type information recording medium, such as a multilayer type or dual layer or multiple layer type optical disc, for example, has the management information area in or near a lead-in area located near the inner circumference. In the management information area, the preferable irradiation condition information is recorded, wherein the preferable irradiation condition information is to define the preferable irradiation condition of the laser light for recording, for each recording state of another recording layer out of the plurality of recording layers. The preferable irradiation condition information may be recorded from the beginning of the production of the information recording medium, or may be recorded upon subsequent pre-formatting or formatting. Alternatively, before the information is recorded, the value of default may be recorded in the management information area, and then, it may be updated by a non-default value.

Incidentally, the preferable irradiation condition information may be directly defined, or indirectly defined, for example, by defining it with a coefficient based on one irradiation condition (e.g. the pulse width).

Since the preferable irradiation condition information is recorded in the management information area in this manner, upon the recording thereof, performed by the information recording apparatus, such as an optical disc recorder, at first, the preferable irradiation condition information is read. Then, on the basis of the preferable irradiation condition information, it is possible to irradiate the laser light in the preferable irradiation condition, regardless of the recording state, which is recorded or unrecorded or the like, of another recording layer, such as the recording layer located on the front as viewed from the irradiation side of the laser light. By this, it is possible to record the information in a good condition, onto the multilayer type information recording medium, regardless of its recording state.

A second embodiment of the information recording medium of the present invention is an information recording medium, provided with a plurality of recording layers to record therein information by irradiating the information recording medium with laser light for recording, and having a first test writing area in which the information is recorded in another recording layer out of the plurality of recording layers and a second test writing area in which the information is not recorded in the another recording layer, in order to obtain a preferable irradiation condition of the laser light which is preferable to one recording layer in which the information is scheduled to be recorded, out of the plurality of recording layers.

According to the second embodiment of the information recording medium of the present invention, one of the plurality of recording layers, which are stacked or laminated on one side of a substrate, i.e., which constitute the multilayer type information recording medium, such as a multilayer type or dual layer or multiple layer type optical disc, for example, has the first test writing area in which the information is recorded in another recording layer and the second test writing area in which the information is not recorded in the another recording layer.

Since there are provided the first and second test writing areas, upon the recording thereof, performed by the information recording apparatus, such as an optical disc recorder, test writing is performed into the both first and second test writing areas, as occasion demands. For example, the OPC is performed. Then, on the basis of the test writing result, it is possible to irradiate the laser light in the preferable irradiation condition, regardless of the recording state, which is recorded or unrecorded or the like, of another recording layer, such as the recording layer located on the front as viewed from the irradiation side of the laser light. By this, it is possible to record the information in a good condition, onto the multilayer type information recording medium, regardless of its recording state.

These effects and other advantages of the present invention become more apparent from the following examples.

As explained above, according to the embodiment of the information recording apparatus in the present invention, it is provided with: the setting device; and the irradiating device, and according to the embodiment of the information recording method in the present invention, it is provided with: the setting process; and the irradiating process Therefore, it is possible to record the information in a good condition, onto the multilayer type information recording medium, regardless of its recording state. Moreover, according to the first or second embodiment of the information recording medium of the present invention, it is provided with: the management information area; or the test writing area. Therefore, it is possible to record the information in a good condition, onto the multilayer type information recording medium, regardless of its recording state.

EXAMPLES

An optical disc according to the example of the information recording medium will be discussed in detail, with reference to FIG. 1 to FIG. 5.

At first, with reference to FIG. 1, the basic structure of the optical disc in the example will be discussed. FIG. 1 shows the basic structure of the optical disc according to the example of the information recording medium of the present invention, wherein the upper part is a substantial plan view showing the optical disc having a plurality of areas and the corresponding lower part is a schematic conceptual view showing a recording area structure in the radial direction.

As shown in FIG. 1, an optical disc 100 has a recording surface on a disc main body with a diameter of about 12 cm, as is a DVD. On the recording surface, the optical disc 100 is provided with: a lead-in area 101; a data zone 102; and a lead-out area 103, which are associated with the example, from the inner circumferential side to the outer circumferential side, with a center hole 1 as the center. Then, in each recording area, a track or tracks 10, such as a groove track and a land track, are alternately placed, spirally or concentrically, with the center hole 1 as the center. On the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101 or the lead-out area 103 does not exist, a data structure explained below can be constructed. Moreover, as described later, the lead-in area 101 or the lead-out area 103 may be further segmentized.

Figure 2:
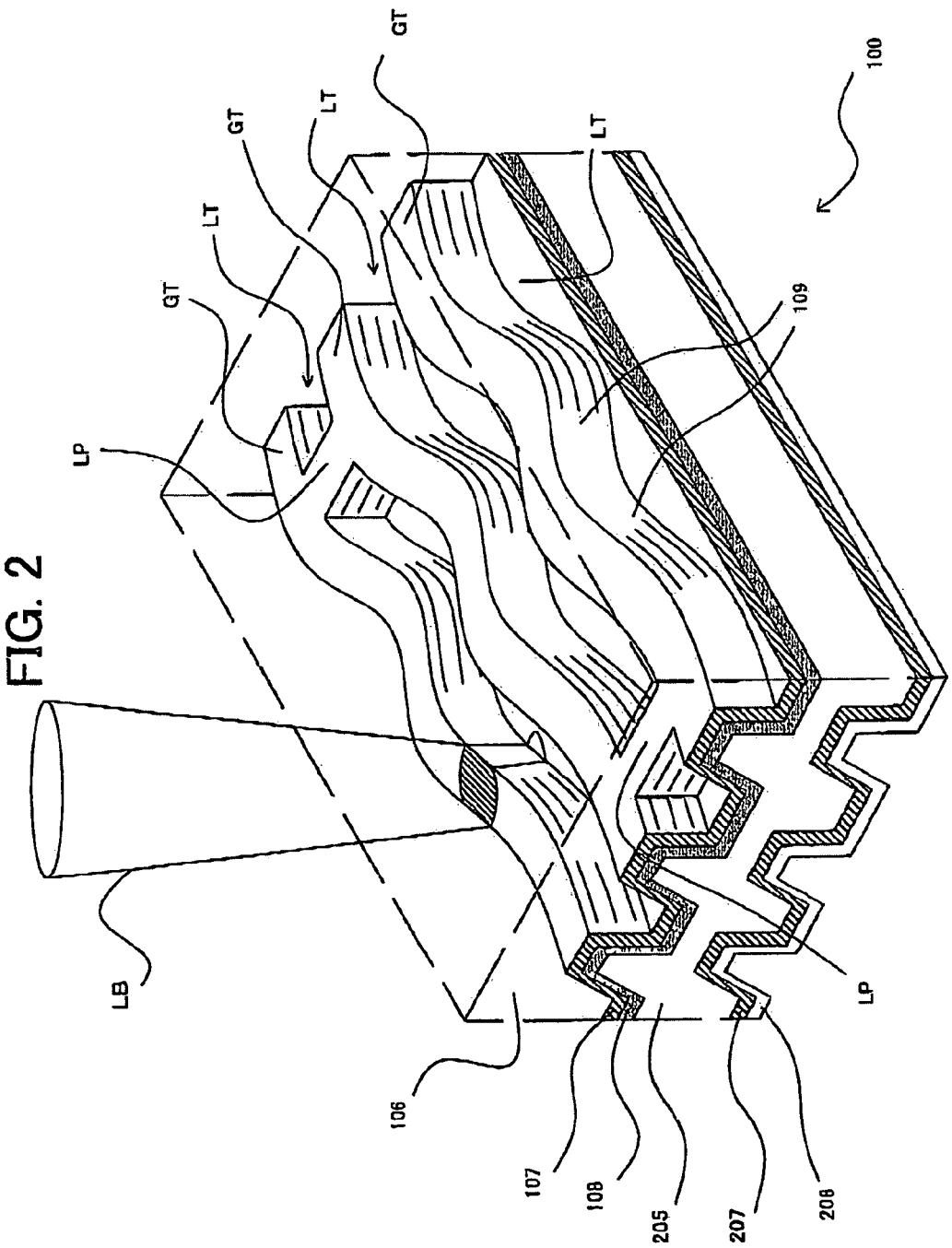
[FIG. 2]

Next, with reference to FIG. 2, the physical structure of the optical disc in the example will be explained. More specifically, the optical disc 100 in the example is constructed as a two-layer type optical disc in which a plurality of data zones 102 or the like area formed in a laminated structure. FIG. 2 is a partially enlarged perspective view showing a recording surface of the optical disc according to the example of the information recording medium of the present invention.

In FIG. 2, in the example, in the optical disc 100, a first recording layer 107 of a phase change type or of an irreversible change recording type by heat or the like which constitutes an information recording surface is stacked or laminated on (on the lower side of, in FIG. 2) a disc-shaped transparent substrate 106, and a semitransparent reflective film 108 is stacked or laminated thereon (on the lower side in FIG. 2). On the information recording surface which is the surface of the first recording layer 107, a groove track GT and a land track LT are alternately formed. Incidentally, upon the recording and the reproduction of the optical disc 100, as shown in FIG. 2, for example, the groove track GT is irradiated with laser light LB through the transparent substrate 106. For example, upon the recording, by irradiating the laser light LB with a recording laser power, writing by a phase change into the first recording layer 107 or irreversible change recording by heat is performed, in accordance with the record data. On the other hand, upon the reproduction, by irradiating the laser light LB with a reproduction laser power weaker than the recording laser power, the record data written in the first recording layer 107 is read.

In the example, the groove track GT is wobbled with a certain amplitude and at a certain spatial frequency. In other words, the groove track GT is wobbled, and the cycle of the wobble 109 is set to a predetermined value. On the land track LT, there is formed an address pit which is referred to as a land pre-pit LP and which indicate pre-format address information. By virtue of the two addressing (i.e. the wobble 109 and the land pre-pit LP), it is possible to obtain information necessary for data recording, such as a recording address, disc rotation control during the recording, or generation of a recording clock. Incidentally, it is also possible to record the pre-format address information in advance, by modulating the wobble 109 of the groove track GT in a predetermined modulation method, such as frequency modulation and phase modulation.

Particularly in the example, a second recording layer 207 is formed on (on the lower side of, in FIG. 2) the semitransparent reflective film 108, and a reflective film 208 is formed thereon (on the lower side in FIG. 2). The second recording layer 207 is constructed such that the recording and reproduction of a phase change type or of an irreversible change recording type by heat or the like can be performed by irradiating it with the laser light LB through the transparent substrate 106, the first recording layer 107, and the semitransparent reflective film 108, in substantially the same manner of the first recording layer 107. The second recording layer 207 and the reflective film 208 may be coated and formed on the transparent substrate 106 on which the first recording layer 107 and the semitransparent reflective film 108 or the like are formed. Alternatively, after coated and formed on different substrates, and the second recording layer 207 and the reflective film 208 may be bonded or pasted on the transparent substrate 106. Incidentally, there is provided a transparent middle layer 205 made of a transparent adhesive or the like, between the semitransparent reflective film 108 and the second recording layer 207, as occasion demands, in accordance with the production method.

Upon the recording/reproduction of such a two-layer type optical disc 100, the recording/reproduction in the first recording layer 107 or the second recording layer 207 is performed, depending on which recording layer has the focus position of laser light LB.

Incidentally, the optical disc 100 in the example is not limited to a two-layer single sided type, i.e., a dual layer type, as shown in FIG. 2, but may be one-layer double sided type, i.e., a double sided type, or a two-layer double sided type, i.e., a dual layer double sided type. Furthermore, the optical disc 100 in the example is not limited to the optical disc having the two recording layers, as described above, but may be an optical disc of a multilayer type which has three or more layers.

Figure 3:
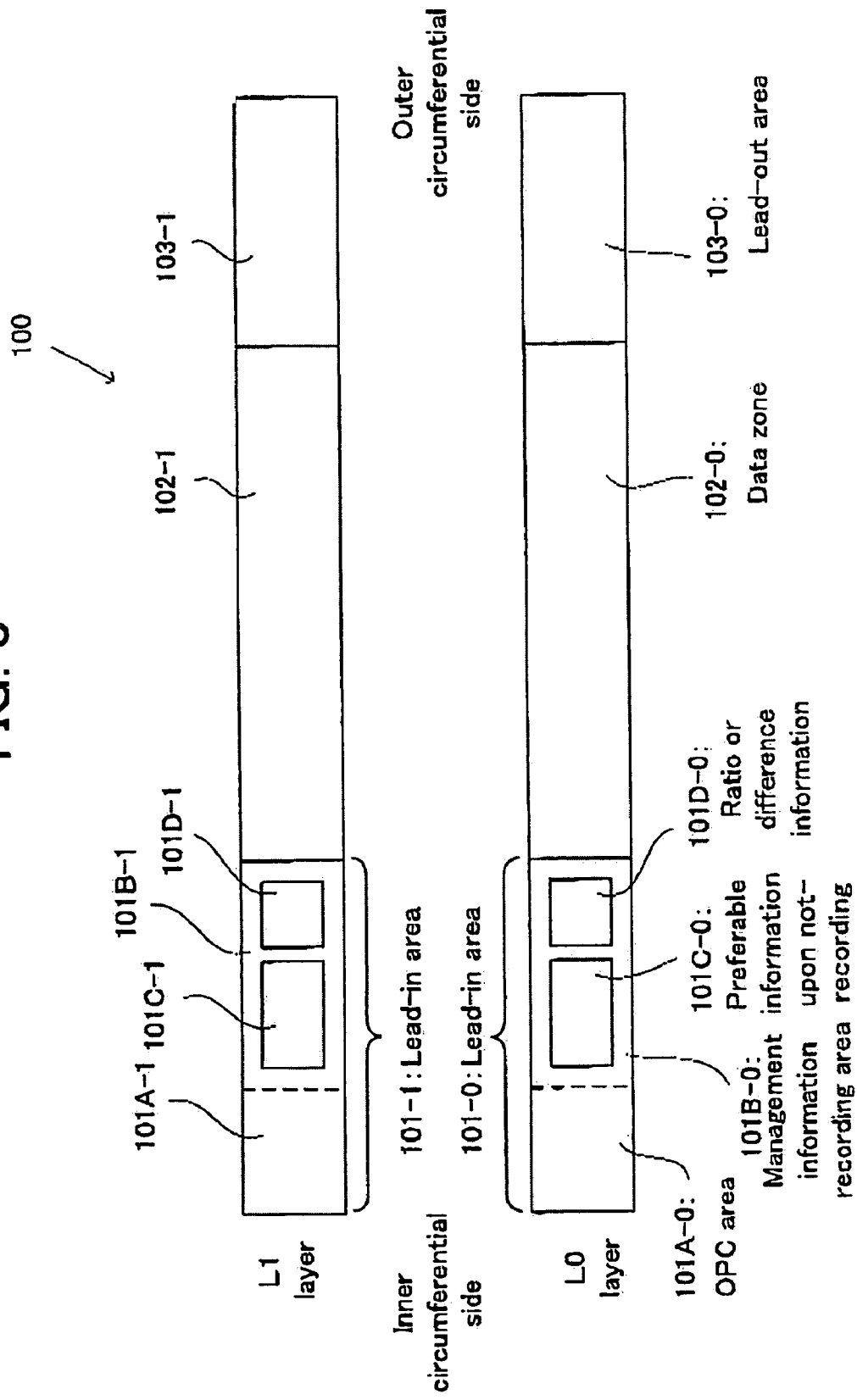
[FIG. 3]

Next, with reference to FIG. 3, the data structure of the optical disc in the example will be discussed. FIG. 3 is a data structural view conceptually showing an example of the data structure of the optical disc in the example.

As shown in FIG. 3, the optical disc 100 has two recording layers, i.e., an L0 layer (i.e. a recording layer corresponding to the first recording layer 107 in FIG. 1 and FIG. 2) and an L1 layer (i.e. a recording layer corresponding to the second recording layer 207 in FIG. 1 and FIG. 2).

The L0 layer is provided with: a lead-in area 101-0; a data zone 102-0; and a lead-out area 103-0. The lead-in area 101-0 is provided with an OPC (Optimum Power Calibration) area 101A-0 and a management information recording area 101B-0, which constitutes one example of the "management information area" of the present invention. In the management information recording area 101B-0, there are recorded (i) preferable information 101C-0 upon not-recording, which indicates the preferable irradiation condition of the laser light in the L1 layer if the L0 layer is unrecorded and which constitutes one example of the "preferable irradiation condition information" of the present invention, and (ii) ratio or difference information 101D-0, which constitutes one example of the "relationship information" of the present invention. In the management information recording area 101B-0, there may be also recorded preferable information upon recording, which indicates the preferable irradiation condition of the laser light in the L1 layer if the L0 layer is recorded, in place of the ratio or difference information 101D-0. Incidentally, the preferable information 101C-0 upon not-recording and the ratio or difference information 101D-0 will be discussed later.

On the other hand, the L1 layer is also provided with: a lead-in area 101-1; a data zone 102-1; and a lead-out area 103-1. The lead-in area 101-1 is provided with an OPC area 101A-1 and a management information recording area 101B-1. As in the L0 layer, in the management information recording area 101B-1 in the L1 layer, there may be recorded preferable information 101C-1 upon not-recording and ratio or difference information 101D-1 (or preferable information upon recording).

The OPC area 101A-0 (101A-1) is an area used in the detection of an optimum recording laser power (i.e. the calibration of the recording laser power). In particular, the OPC area 101A-0 is preferably used for the detection of the optimum recording laser power in the L0 layer, and the OPC area 101A-1 is preferably used for the detection of the optimum recording laser power in the L1 layer. For example, after the test writing of an OPC pattern is completed, the test-written OPC pattern is reproduced, and the reproduced OPC pattern is subsequently sampled, to thereby detect the optimum recording laser power. Moreover, it is also allowed to record the value of the optimum recording laser power obtained by the OPC.

Next, the type of the data of the land pre-pits which are recorded in the lead-in area in the L1 layer of the optical disc in the example will be discussed. FIG. 4 is a table showing the classification of data of land pre-pits recorded in the lead-in area in the L1 layer of the optical disc in the example. Incidentally, the table shows a field identification number (Field ID), information to be recorded (Content), and a recording location (Location) from the left column.

As shown in FIG. 4, the data of the land pre-pits which are recorded in the lead-in area in the L1 layer, which constitutes one example of the "management information area" of the present invention, is classified into ID#0 to ID#13 by the Field ID.

In the land pre-pit identified by ID#0, information about an ECC (Error Correcting Code) block address is recorded. This land pre-pit is located in all the recording areas of the optical disc. Here, the ECC block address is an error-correctable recording unit, i.e., position information based on the ECC block.

In the land pre-pit identified by ID#1, information, such as extended information, for identifying the L1 layer, is recorded. The land pre-pit is located in the lead-in area of the optical disc.

In the land pre-pit identified by D#2, strategy information for 1X in the case where the L0 layer is unrecorded, which constitutes one example of the preferable irradiation condition information of the present invention, is recorded. The land pre-pit is located in the lead-in area of the optical disc.

In the land pre-pits identified by ID#3 and ID#4, information about a production identification number for identifying the optical disc is recorded. The land pre-pits are located in the lead-in area of the optical disc.

In the land pre-pit identified by ID#5, strategy information for 1X in the case where the L0 layer is recorded, which constitutes one example of the preferable irradiation condition information of the present invention, is recorded. The land pre-pit is located in the lead-in area of the optical disc.

In the land pre-pit identified by ID#6, strategy information for 2X in the case where the L0 layer is unrecorded, which constitutes one example of the preferable irradiation condition information of the present invention, is recorded. The land pre-pit is located in the lead-in area of the optical disc. In the land pre-pit identified by ID#7, strategy information for 2X in the case where the L0 layer is recorded, which constitutes one example of the preferable irradiation condition information of the present invention, is recorded. The land pre-pit is located in the lead-in area of the optical disc.

In the land pre-pits identified by D#8 to ID#10, strategy information for 4X in the case where the L0 layer is unrecorded, which constitutes one example of the preferable irradiation condition information of the present invention, is recorded. The land pre-pits are located in the lead-in area of the optical disc.

In the land pre-pits identified by ID#11 to ID#13, strategy information for 4X in the case where the L0 layer is recorded, which constitutes one example of the preferable irradiation condition information of the present invention, is recorded. The land pre-pits are located in the lead-in area of the optical disc.

Next, with reference to FIG. 5, the arrangement in the lead-in area of the land pre-pits in the L1 layer of the optical disc in the example will be discussed. FIG. 5 is a table showing the arrangement and the ECC block address in the lead-in area of the land pre-pits in the L1 layer of the optical disc in the example. Incidentally, this table shows the field identification number (Field ID), the recording location (Location), and the ECC block address, from the left column.

As shown in FIG. 5, the land pre-pits identified by the field identification numbers of ID#1 to ID #13 or ID#0 are periodically recorded in the lead-in area in the L1 layer. These land pre-pits are located at ECC block addresses of "FFDD05" to "FFCFFF", which are expressed in hexadecimal numeral, for example.

(First Example of Information Recording Apparatus)

Next, with reference to FIG. 6 to FIG. 10, the first example of the information recording apparatus in the present invention will be discussed.

Figure 6:
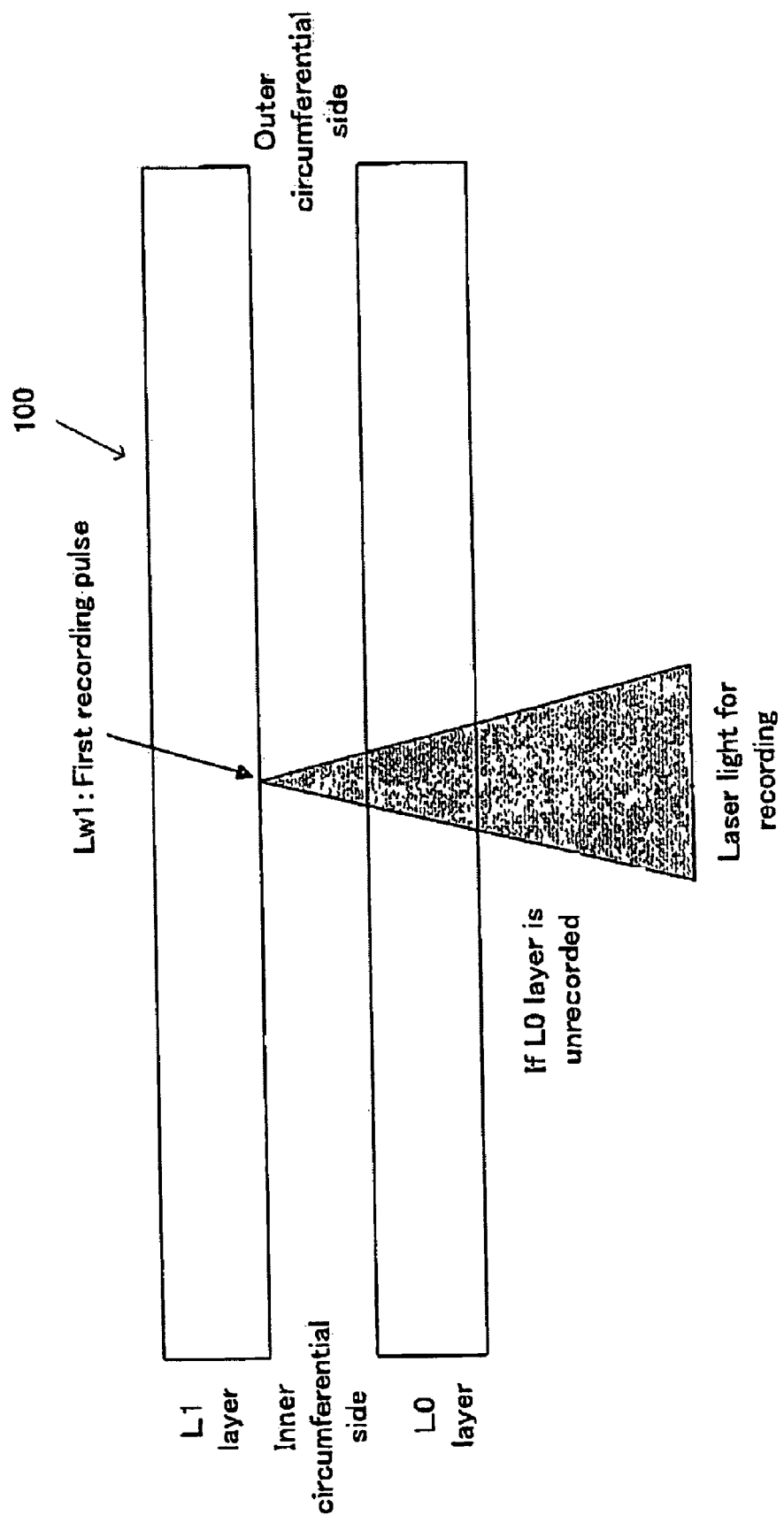
[FIG. 6]
Figure 7:
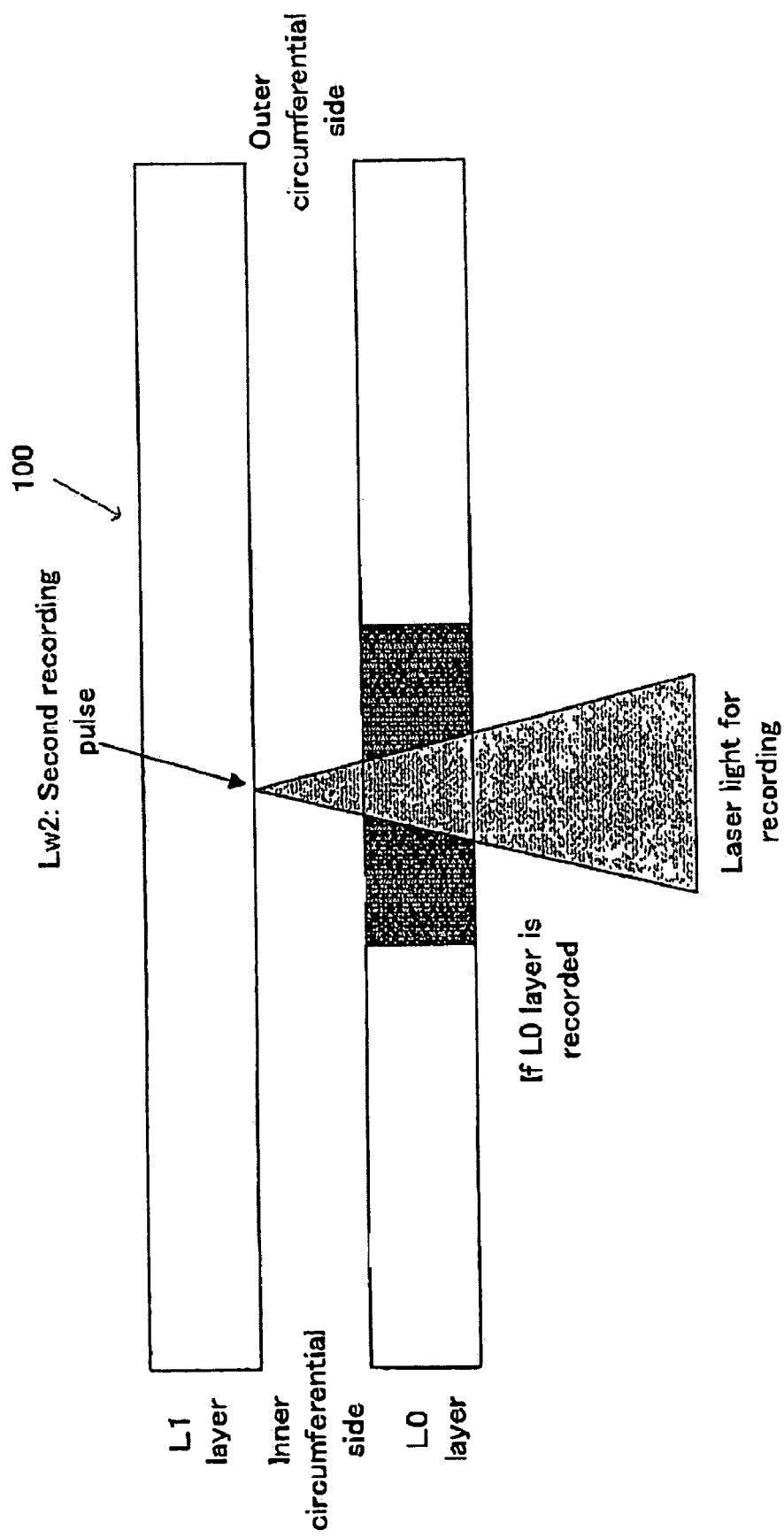
[FIG. 7]

At first, with reference to FIG. 6 and FIG. 7, a basic principle of setting the preferable irradiation condition in the first example of the information recording apparatus in the present invention will be discussed. FIG. 6 and FIG. 7 are schematic conceptual views showing a relationship between laser light for recording and the optical disc, in the case where the L0 layer is unrecorded and in the case where the L0 layer is recorded, on the optical disc in the first example of the information recording apparatus of the present invention.

As shown in FIG. 6 and FIG. 7, the optical disc 100 in the example includes the L0 layer as the first recording layer, and the L1 layer as the second recording layer shown in FIG. 2. Then, the laser light for recording is irradiated from the side of a not-illustrated substrate, i.e., from the lower to the upper side in FIG. 6 and FIG. 7, by a not-illustrated optical pickup of the information recording apparatus, and the focal distance thereof or the like is controlled. At the same time, the travel distance and direction in the radial direction of the optical disc are controlled. By this, the data is recorded into each recording layer. Moreover, if the information recording apparatus functions as an information reproducing apparatus, the recorded data is reproduced.

As shown in FIG. 6, if the L0 layer is unrecorded, the unrecorded state of the L0 layer is detected by scanning performed by a CPU, an LD driver, and an optical pickup or the like, which constitute one example of the "setting device" of the present invention. Simultaneously, a first recording pulse which defines one example of the "preferable irradiation condition" of the present invention is set in the data recording. The details of the first recording pulse will be discussed later.

As shown in FIG. 7, if the L0 layer is recorded, the recorded state of the L0 layer is detected by scanning performed by the CPU, the LD driver, and the optical pickup or the like. Simultaneously, a second recording pulse which defines another example of the "preferable irradiation condition" of the present invention is set in the data recording. The details of the second recording pulse will be discussed later.

As seen from FIG. 6 and FIG. 7, if transmittance in a portion of the L0 layer located on the optical path of the laser light with which the L1 layer is irradiated decreases because the L0 layer is already recorded (refer to FIG. 7), the amount of the light reaching the L1 layer and the amount of the light detected from the L1 layer decrease. In other words, if the transmittance in a portion of the L0 layer located on the optical path of the laser light with which the L1 layer is irradiated does not decrease because the L0 layer is unrecorded (refer to FIG. 6), the amount of the light reaching the L1 layer and the amount of the light detected from the L1 layer relatively increase. Therefore, as explained below, the example is to compensate the increase/decrease in the amount of the light reaching the L1 layer according to the recording or unrecording in the L0 layer, basically on the light source side of the laser light.

Next, with reference to FIG. 8 to FIG. 10, a specific example of the preferable irradiation condition according to the first example of the information recording apparatus of the present invention will be discussed.

Particularly in the first example, the preferable irradiation condition information as illustrated in FIG. 3 to FIG. 5 is not necessarily recorded on the optical disc 100 side, and is stored in a memory disposed on the information recording apparatus side in the example. The preferable irradiation condition information is read if necessary, and used for the setting of the preferable information condition. Incidentally, with respect to the preferable irradiation condition information, what is obtained by performing the OPC process for the optical disc 100 by the information recording apparatus may be stored in the memory disposed on the information recording apparatus side, in a form that the preferable irradiation condition information corresponds to the disc identification number of the optical disc 100, for example. Alternatively, the preferable irradiation condition information recorded on the optical disc 100 side, as illustrated in FIG. 3 to FIG. 5, may be read and stored in the memory disposed on the information recording apparatus side.

At first, with reference to FIG. 8, an explanation will be given to the laser of a pulse type (hereinafter referred to a "recording pulse") characterized by pulse intensity which is one specific example of the preferable irradiation condition according to the first example of the information recording apparatus of the present invention. FIG. 8 is a graph showing the recording pulse characterized by the pulse intensity which is one specific example of the preferable irradiation condition according to the first example of the information recording apparatus of the present invention, wherein the vertical axis shows the intensity (power) of the recording pulse and the horizontal axis shows time.

Figure 8:
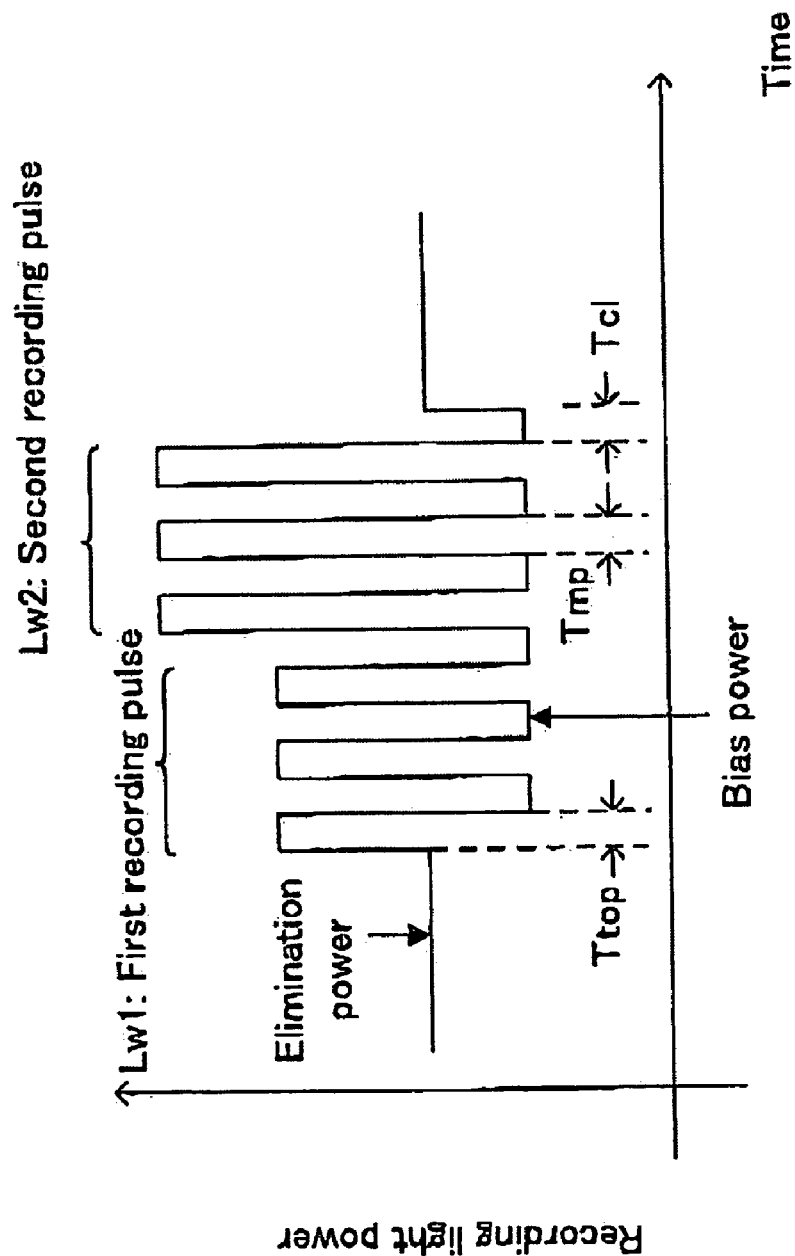
[FIG. 8]

As shown in FIG. 8, the recording pulse is provided with: a first top pulse top; a plurality of multi pulses mp in which the irradiation time is divided into shorter times; and a cooling pulse c1. Incidentally, it is defined such that a time interval in which the top pulse top is irradiated is Ttop, a time interval in which the multi pulse mp is irradiated is Tmp, and a time interval in which the cooling pulse c1 is irradiated is Tc1.

As shown in FIG. 8, in the preferable irradiation condition, a change in the L0 layer from the unrecorded state to the recorded state is detected, under the control of a CPU or the like, in the recording in the L1 layer. For example, the setting is changed from a first recording pulse Lw1 to a second recording pulse Lw2.

More specifically, at first, in the first recording pulse Lw1, the top pulse top and the multi pulse mp are set to a recording laser power of 8.0 (mW).

Then, in the second recording pulse Lw2, the setting of the multi pulse mp is changed to a recording laser power of 12.0 (mW), for example. By increasing the pulse intensity as described above, it is possible to eliminate influences, such as the decrease in light transmittance caused by that the L0 layer is already recorded.

Incidentally, in a time interval in which the recording pulse is not irradiated with the power of the laser for recording, i.e. a down time, the power is set to a bias laser power, which is weaker than an erasing laser power of 0.6 (mW), for example. The cooling pulse c1 is provided in the end of the recording pulse, and set to the bias laser power, as with the down time. Moreover, the time interval Tmp in which the multi pulse mp is irradiated is equally set.

As described above, it is possible to eliminate the influences, such as the decrease in light transmittance, by setting the preferable irradiation condition, such as the pulse intensity and recording strategy, in accordance with the recording state of the L0 layer, in the recording in the L1 layer, under the control of the CPU or the like.

Next, with reference to FIG. 9, an explanation will be given to a recording pulse characterized by a pulse width which is another specific example of the preferable irradiation condition according to the first example of the information recording apparatus of the present invention. FIG. 9 is a graph showing the recording pulse characterized by the pulse width which is another specific example of the preferable irradiation condition according to the first example of the information recording apparatus of the present invention, wherein the vertical axis and the horizontal axis are the same as those of the above-mentioned explanation in FIG. 8. Moreover, the definition of the top pulse top, the multi pulse mp, and the cooling pulse or the like is also the same as that of the explanation in FIG. 8.

Figure 9:
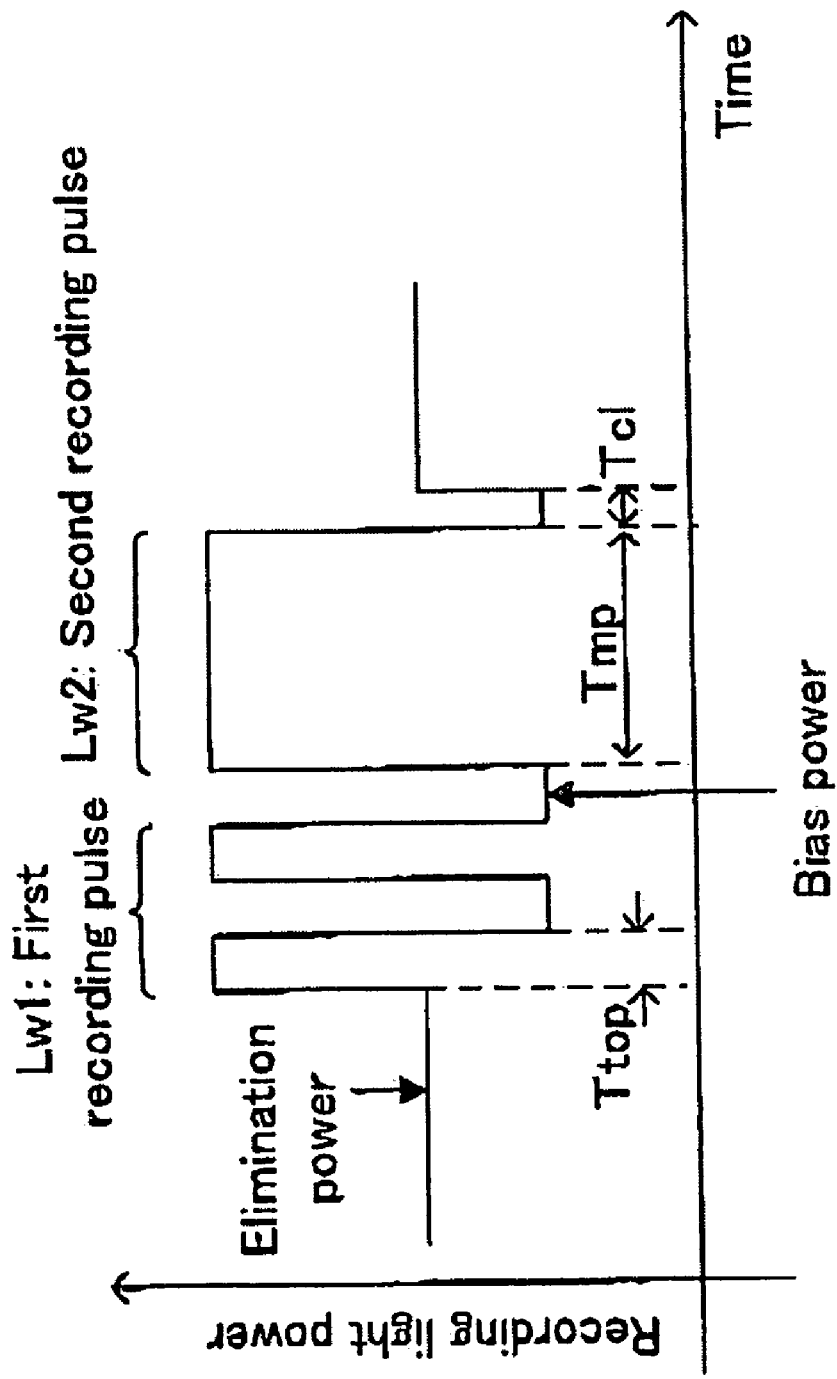
[FIG. 9]

As shown in FIG. 9, in the preferable irradiation condition, a change in the L0 layer from the unrecorded state to the recorded state is detected, under the control of the CPU or the like, in the recording in the L1 layer. For example, the setting is changed from the first recording pulse Lw1 to the second recording pulse Lw2.

More specifically, at first, in the first recording pulse Lw1, the top pulse top and the multi pulse mp are set to a recording power of 8.0 (mW), for example, and set to reduce the pulse width.

Then, in the second recording pulse Lw2, the setting is changed to increase the time interval Tmp in which the multi pulse mp is irradiated, i.e. to increase the pulse width. Incidentally, the intensity of the multi pulse mp may be 8.0 (mW), for example, as in the first recording pulse Lw1.

As described above, it is possible to eliminate the influences, such as the decrease in light transmittance, by setting the preferable irradiation condition, such as the pulse width and the recording strategy, in accordance with the recording state of the L0 layer, in the recording in the L1 layer, under the control of the CPU or the like.

Next, with reference to FIG. 10, an explanation will be given to a graph showing a recording pulse characterized by the pulse intensity and the pulse width which are another specific example of the preferable irradiation condition according to the first example of the information recording apparatus of the present invention. FIG. 10 is a graph showing a recording pulse characterized by the pulse intensity and the pulse width which are another specific example of the preferable irradiation condition according to the first example of the information recording apparatus of the present invention, wherein the vertical axis and the horizontal axis are the same as those of the above-mentioned explanation in FIG. 8. Moreover, the definition of the top pulse top, the multi pulse mp, and the cooling pulse or the like is also the same as that of the explanation in FIG. 8.

Figure 10:
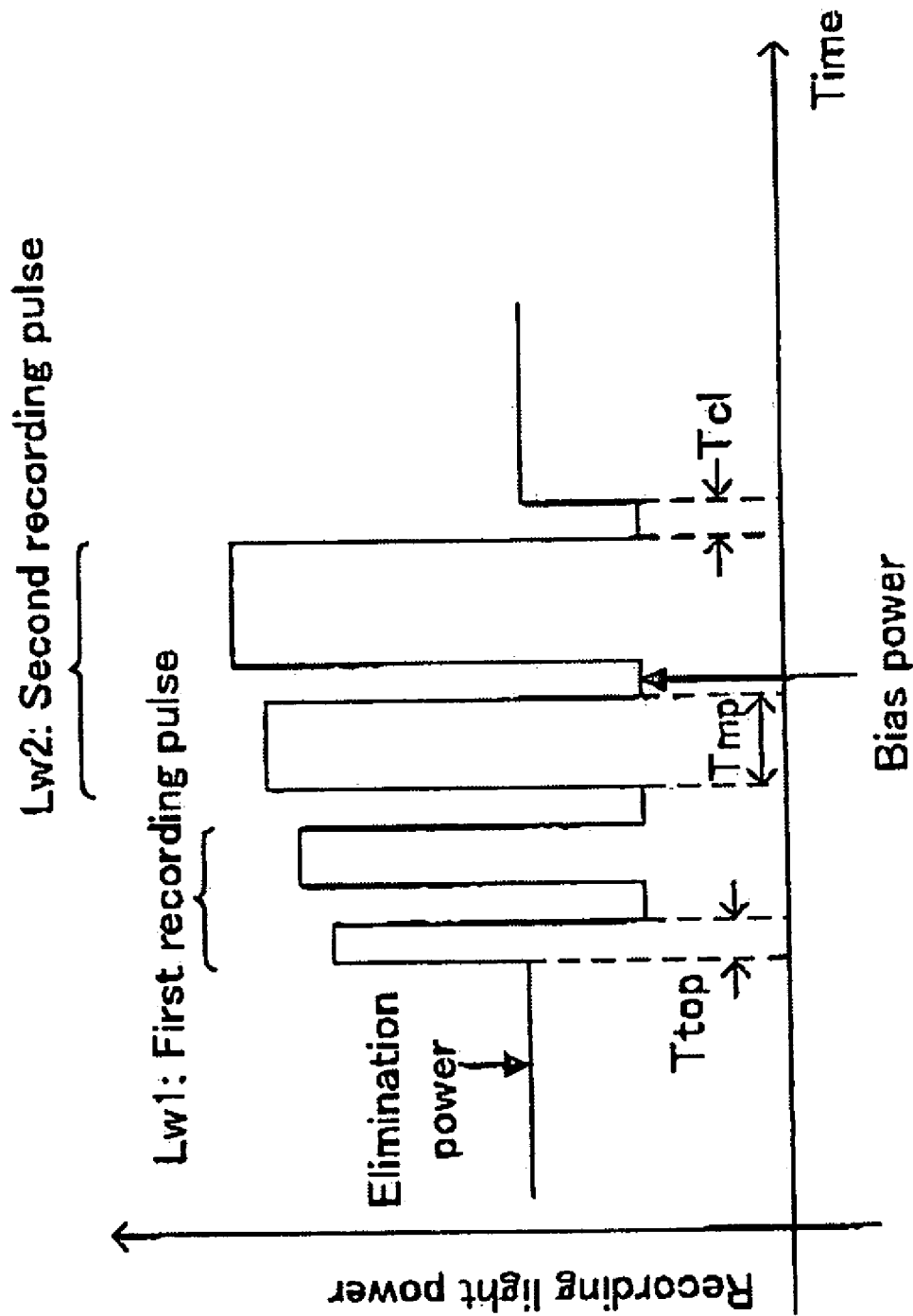
[FIG. 10]

As shown in FIG. 10, in the preferable irradiation condition, a gradual change in the L0 layer from the unrecorded state to the recorded state is detected, under the control of the CPU or the like, in the recording in the L1 layer. For example, the setting is changed in stages from the first recording pulse Lw1 to the second recording pulse Lw2.

More specifically, at first, in the first recording pulse Lw1, the top pulse top and the multi pulse mp are set to a recording power of 8.0 (mW), for example, and set to reduce the pulse width.

Then, in the second recording pulse Lw2, the setting is changed to increase the recording laser power in stages, i.e. to increase the pulse intensity in stages. Simultaneously, the setting is changed increase the time interval Tmp in stages in which the multi pulse mp is irradiated, i.e. to increase the pulse width in stages.

As described above, it is possible to eliminate the influences, such as the decrease in light transmittance, by setting the preferable irradiation condition, such as the pulse intensity, the pulse width, the pulse shape and the recording strategy, in accordance with the recording state of the L0 layer, in the recording in the L1 layer, under the control of the CPU or the like.

(Second Example of Information Recording Apparatus)

Figure 11:
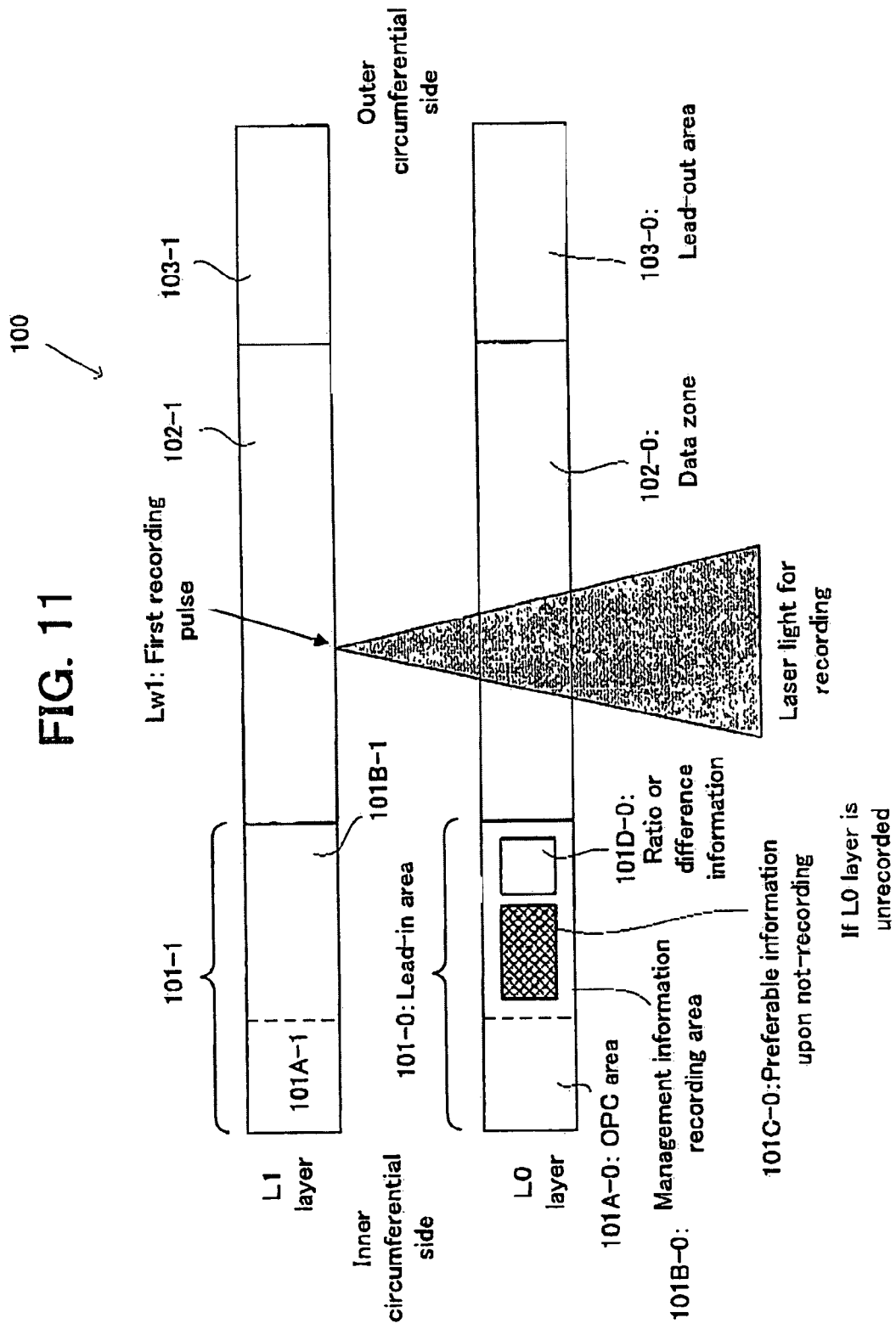
[FIG. 11]
Figure 12:
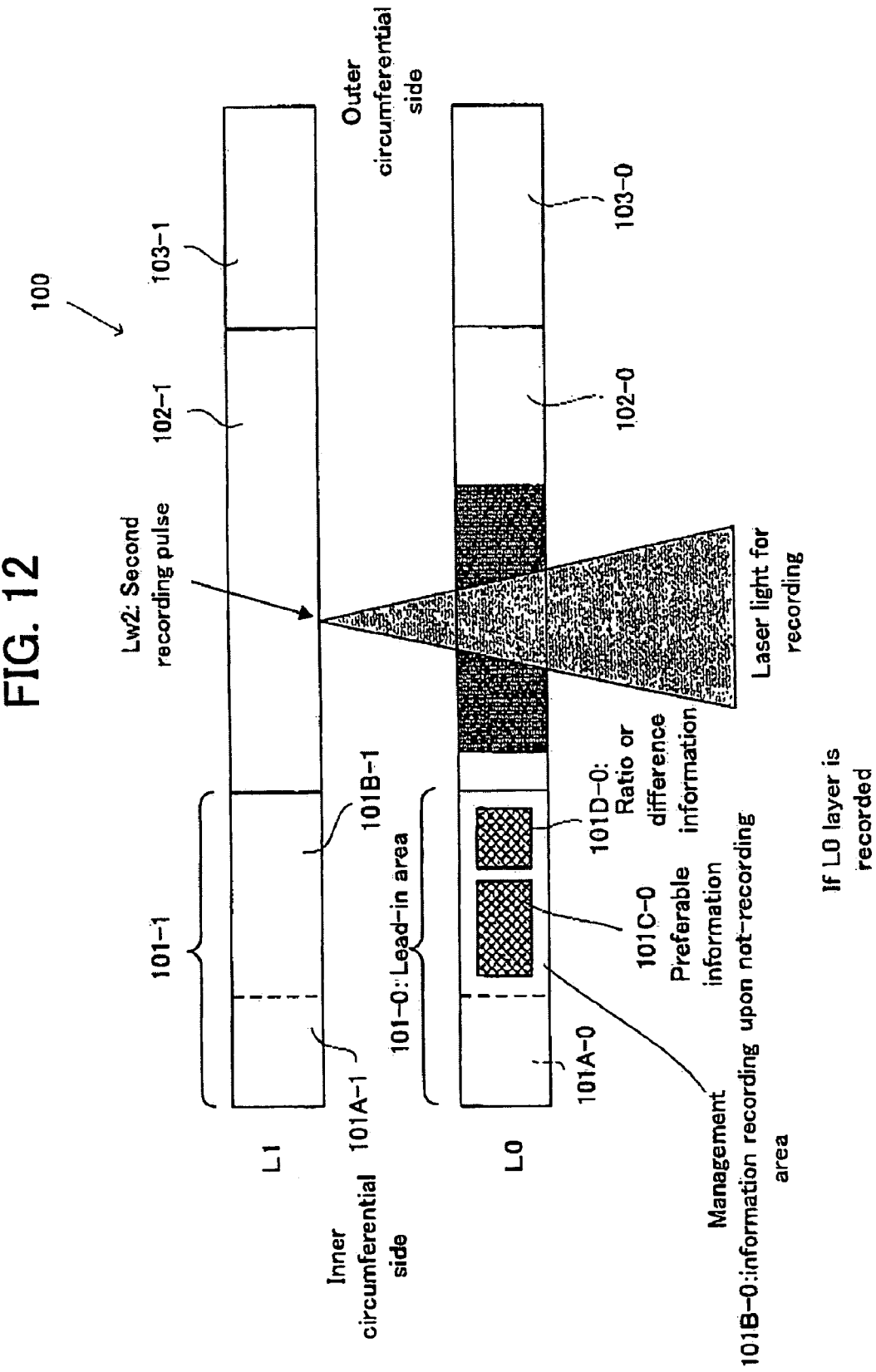
[FIG. 12]

Next, with reference to FIG. 11 and FIG. 12, the second example of the information recording apparatus of the present invention will be discussed. FIG. 11 and FIG. 12 are schematic conceptual views showing the relationship between the laser light for recording and the optical disc in the case where the L0 layer is unrecorded and in the case where the L0 layer is recorded, on the optical disc according to a second example of the information recording apparatus of the present invention.

The basic principle in which the preferable irradiation condition is set in the second example of the information recording apparatus is the same as that of the first example of the information recording apparatus of the present invention which is explained with reference to FIG. 6 to FIG. 10 described above.

Particularly in the second example, the preferable irradiation condition information as illustrated in FIG. 3 to FIG. 5 is recorded on the optical disc 100 side. The preferable irradiation condition information is read if necessary, and used for the setting of the preferable irradiation condition. Incidentally, the preferable irradiation condition information may be read after the optical disc 100 is loaded into the information recording apparatus, stored in a memory disposed on the information recording apparatus side, and read, if necessary, from the memory.

As shown in FIG. 11, in the second example of the information recording apparatus, if the optical disc 100 is loaded or mounted, a seek operation is performed by the optical pickup or the like, under the control of the CPU or the like, to thereby obtain various management information required for the recording operation with respect to the optical disc 100. More specifically, the preferable information 101C-0 upon not-recording in the L1 layer if the L0 layer is unrecorded, which constitutes one example of the "preferable irradiation condition information" of the present invention recorded in the management information recording area 101B-0, is obtained. At the same time, the ratio or difference information 101D-0, which constitutes one example of the "relationship information" of the present invention, is also obtained. Here, the ratio or difference information 101D-0 is numerical information which represents a ratio or difference between (i) the preferable information 101C-0 upon not-recording and (ii) the preferable irradiation condition information in the L1 layer in the case where the L0 layer is recorded. Incidentally, the preferable information 101C-0 upon not-recording and the ratio or difference information 101D-0 may be recorded in the L1 layer.

As described above, if the L0 layer is unrecorded, the preferable irradiation condition is set on the basis of the preferable information 101C-0 upon not-recording. For example, the first recording pulse Lw1 with pulse intensity of 10.0 (mW) is irradiated to the L1 layer.

On the other hand, as shown in FIG. 12, if the L0 layer is recorded, the preferable irradiation condition information in the L1 layer in the case where the L0 layer is recorded is calculated by multiplication or addition of the preferable information 101C-0 upon not-recording and the ratio or difference information 101D-0, to thereby set the preferable irradiation condition. For example, if the ratio or difference information 101D-0 is "1.2" or "2.0 (mW)", the pulse intensity value of 10.0 (mW) which is set on the basis of the preferable information 101C-0 upon not-recording, is multiplied by or added to the ratio or difference information 101D-0, which results in 10.0 (mW)×1.2=12.0 (mW) or 10.0 (mW)+2.0 (mW)=12.0 (mW).

As described above, if the L0 layer is recorded, the preferable irradiation condition is set on the basis of the preferable information 101C-0 upon not-recording and the ratio or difference information 101D-0. For example, the second recording pulse Lw2 with pulse intensity of 12.0 (mW) is irradiated to the L1 layer.

(Information Recording/Reproducing Apparatus)

Next, with reference to FIG. 13, the structure and the operation of the information recording apparatus in the present invention will be discussed. Particularly, in the example, the information recording apparatus of the present invention is applied to an information recording/reproducing apparatus for the optical disc described above.

At first, with reference to FIG. 13, the structure of an information recording/reproducing apparatus 300 according to the example of the information recording apparatus of the present invention will be discussed. FIG. 13 is a block diagram showing the information recording/reproducing apparatus 300 according to the example of the present invention. Incidentally, the information recording/reproducing apparatus 300 has a function of recording the record data onto the optical disc 100 and a function of reproducing the record data recorded on the optical disc 100.

Figure 13:
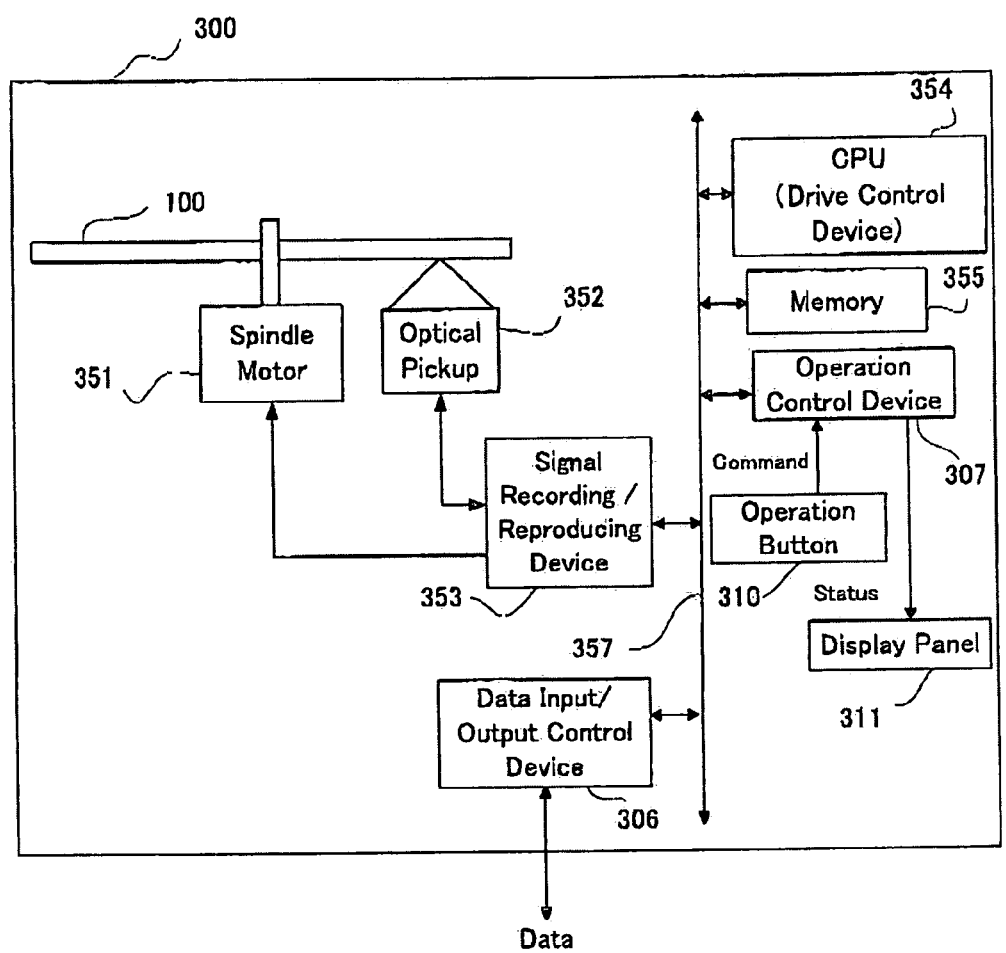
[FIG. 13]

With reference to FIG. 13, the inner structure of the information recording/reproducing apparatus 300 will be discussed. The information recording/reproducing apparatus 300 is an apparatus for recording the information onto the optical disc 100 and reading the information recorded on the optical disc 100, under the control of a CPU 354.

The information recording/reproducing apparatus 300 is provided with: the optical disc 100; a spindle motor 351; an optical pickup 352; a signal recording/reproducing device 353; the CPU (drive control device) 354; a memory 355; a data input/output control device 306; an operation button 310; a display panel 311; and a bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is intended to perform the recording/reproduction with respect to the optical disc 100, and is provided with a laser device, a lens, and the like. More specifically, the optical pickup 352 irradiates the optical disc 100 with a light beam, such as a laser beam, as reading light with a first power upon reproduction, and as writing light with a second power upon recording, with it modulated. In particular, the optical pickup 352 constitutes one example of the "irradiating device" of the present invention.

The signal recording/reproducing device 353 controls the spindle motor 351 and the optical pickup 352, to thereby perform the recording/reproduction with respect to the optical disc 100. More specifically, the signal recording/reproducing device 352 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 352, i.e. the reflective light of a light beam, and outputs the amplified signal.

Particularly in the example, the signal recording/reproducing device 353 sets the preferable irradiation condition, such as the pulse intensity, the pulse width, the pulse shape, and the recording strategy, in accordance with the recording state of the L0 layer, in the recording in the L1 layer, together with the CPU 354 or the like.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as recording equipment is stored; a buffer for compression/decompression of video data; a RAM area into which a parameter required for a program operation is stored; and the like.

Particularly in the example, the memory 355 constitutes one example of the "storing device" of the present invention. In the memory 355, the "preferable irradiation condition information", the "relationship information", or the "table information" or the like of the present invention is stored.

The CPU (drive control device) 354 is connected to the signal recording/reproducing device 353 and the memory 355 through the bus 357, and controls the entire information recording/reproducing apparatus 300 by giving an instruction to each controlling device. Normally, software for operating the CPU 354 is stored in the memory 355. In particular, the CPU 354 constitutes one example of the "setting device" and the "judging device" or the like of the present invention.

The data input/output control device 306 controls the input/output of the data from the exterior with respect to the information recording/reproducing apparatus 300, to thereby perform storage to and export from the data buffer on the memory 355. If the input/output of the data is a video signal, the data input/output control device 306 compresses (encodes) the data received from the exterior into a MPEG format upon the data input, and outputs it to the memory 355. Moreover, the data input/output control device 306 decompresses (decodes) the data in the MPEG format received from the memory 355, and outputs it to the exterior.

The operation control device 307 receives an operation instruction and performs display with respect to the information recording/reproducing apparatus 300, and transmits an instruction by the operation button 310, such as an instruction to record or reproduce, to the CPU 354. Moreover, the operation control device 307 outputs the operational state of the information recording/reproducing apparatus 300, such as during recording and during reproduction, to the display panel 310, such as a fluorescent tube.

One example of the information recording/reproducing apparatus 300, as explained above, is recorder equipment for recording and reproducing video images in household equipment. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 355, on the CPU 354.

(Flow of Recording Operation performed by Information Recording Apparatus)

Figure 14:
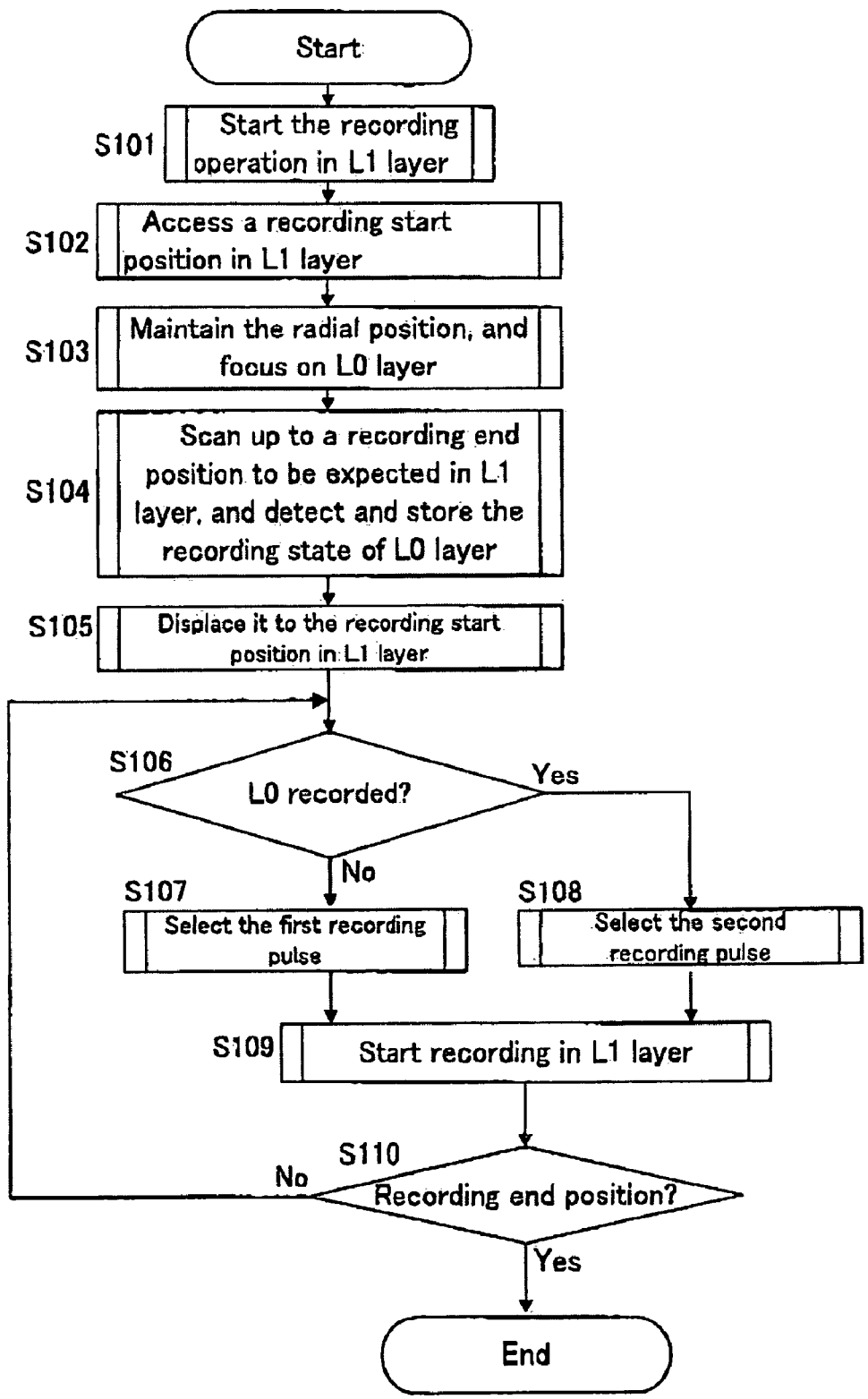
[FIG. 14]

Next, with reference to FIG. 14, a flow of the recording operation of the information recording apparatus for the optical disc in the example of the present invention will be discussed. FIG. 14 is a flowchart showing the recording operation of the optical disc by the information recording apparatus according to the example of the present invention.

In FIG. 14, at first, if the optical disc 100 is loaded, the seek operation is performed by the optical pickup 352, under the control of the CPU 354, to obtain various management information required for the recording process with respect to the optical disc 100. On the basis of the management information, the recording operation of the data is started into the L1 layer of the optical disc 100 by the data input/output control device 306, in accordance with an instruction from exterior input equipment or the like, under the control of the CPU 354 (step S101).

Then, the optical pickup 352 is displaced in the radial direction to a recording start position in the L1 layer, e.g. to a recording start position based on a physical address, such as a sector number (step S102).

Then, the optical pickup 352 is focused on the L0 layer, while maintaining the radial position of the recording start position in the L1 layer (step S103).

Then, in the L0 layer, sweeping, i.e. scan, is performed up to the same radial position as a recording end position to be expected in the L1 layer, to thereby detect whether or not the information is recorded or unrecorded by each physical address unit, such as a sector number, which is one example of the "predetermined area unit" of the present invention with respect to the L1 layer, and to store the information which shows the result of sweeping into the memory 355 or the like which constitutes one example of the "storing device" of the present invention (step S104). Particularly in the example, space bitmap information or the like which constitutes one example of the "table information" of the present invention may be collectively stored in the memory 355 or the like.

Then, the optical pickup 352 is focused on the L1 layer and displaced in the radial direction to the above-mentioned recording start position in the L1 layer (step S105).

Then, by the CPU 354 or the like, it is judged whether or not the information is recorded or unrecorded in the L0 layer at the same radial position as the recording position in the L1 layer (step S106). If it is not recorded, i.e. if it is unrecorded (the step S106: No), for example, the first recording pulse is set as the preferable irradiation condition (step S107). In this case, on the basis of the preferable information upon not-recording which is read from the management information recording area 101B-0 of the optical disc 100 (refer to FIG. 3 and FIG. 11, etc.), the first recording pulse in the preferable irradiation condition is set. Alternatively, on the basis of the preferable information upon not-recording which is read from the memory 355, the first recording pulse in the preferable irradiation condition is set.

On the other hand, if it is recorded (the step S106: Yes), for example, the second recording pulse is set as the preferable irradiation condition (step S108). In this case, on the basis of the preferable information upon not-recording and the ratio or difference information which are read from the management information recording area 101B-0 of the optical disc 100 (refer to FIG. 3 and FIG. 11, etc.), the second recording pulse in the preferable irradiation condition is set. Alternatively, on the basis of the preferable information upon not-recording and the ratio or difference information which are read from the memory 355, the second recording pulse in the preferable irradiation condition is set.

Then, on the basis of the set preferable irradiation condition, the actual recording operation is started in the L1 layer by the optical pickup 352 or the like (step S109).

Then, it is judged whether or not it is the recording end position to be expected in the L1 layer (step S110). Here, if it is not the recording end position to be expected (the step S110: No), the operational flow returns to the step S106. The preferable irradiation condition is set for each recording state of the L0 layer, and the recording operation is continued.

On the other hand, if it is the recording end position to be expected (the step S110: Yes), a series of recording operation in the L1 layer is ended.

The present invention is not limited to the above-described examples, and various changes may be made, if desired, without departing from the essence or spirit of the invention which can be read from the claims and the entire specification. An information recording apparatus, an information recording method, and an information recording medium, all of which involve such changes, are also intended to be within the technical scope of the present invention.

INDUSTRIAL APPLICABILITY

The information recording apparatus, the information recording method, and the information recording medium according to the present invention can be applied to a multi-layer type optical disc for consumer or industrial use on which various information can be highly densely recorded, and can be applied to a recorder or a player related to the optical disc. Moreover, they can be applied to an information recording medium, an information recording apparatus or the like, which are mounted on or can be connected to various computer equipment for consumer or industrial use, for example.

The invention claimed is:

1. An information recording apparatus for recording information onto an information recording medium by irradiating the information recording medium with laser light for recording, the information recording medium comprising: (i) recording layers in an order of a first recording layer and a second recording layer from an irradiation side of the laser light; (ii) a management information area in which a ratio information which indicates a ratio between (ii-1) a first recording power of the laser light irradiated in the second recording layer, which is transmitted through an unrecorded area of the first recording layer, and (ii-2) a second recording power of the laser light irradiated in the second recording layer, which is transmitted through a recorded area of the first recording layer, is recorded; and (iii) a recording power management area in which a recording power value information which indicates a value of the first recording power or the second recording power is recorded, said information recording apparatus comprising:
- a reading device for reading the ratio information recorded in the management information area and the recording power value information recorded in the recording power management area;
- a setting device for setting the recording power of the laser light on the basis of the ratio information and the recording power value information read by said reading device; and
- an irradiating device for irradiating the second recording layer with the laser light with the recording power set by said setting device.

2. The information recording apparatus according to claim 1, wherein
said information recording apparatus further comprises a judging device for judging whether the first recording layer is unrecorded or recorded, and
said setting device sets the recording power, in accordance with a judgment result by said judging device.

3. The information recording apparatus according to claim 2, wherein said judging device judges whether or not the first recording layer is unrecorded or recorded, by each predetermined area unit, by collectively scanning recording areas in the first recording layer.

4. The information recording apparatus according to claim 2, wherein said judging device judges whether or not the first recording layer is unrecorded or recorded, by referring to table information which indicates whether or not the another recording layer is unrecorded or recorded, by each predetermined area unit in recording areas in the another recording layer.

5. An information recording method of recording information onto an information recording medium by irradiating the information recording medium with laser light for recording, the information recording medium comprising: (i) recording layers in an order of a first recording layer and a second recording layer from an irradiation side of the laser light; (ii) a management information area in which a ratio information which indicates a ratio between (ii-1) a first recording power of the laser light irradiated in the second recording layer, which is transmitted through an unrecorded area of the first recording layer, and (ii-2) a second recording power of the laser light irradiated in the second recording layer, which is transmitted through a recorded area of the first recording layer, is recorded; and (iii) a recording power management area in which a recording power value information which indicates a value of the first recording power or the second recording power is recorded, said information recording method comprising:
- a reading process of reading the ratio information recorded in the management information area and the recording power value information recorded in the recording power management area;
- a setting process of setting the recording power of the laser light on the basis of the ratio information and the recording power value information read by said reading process; and
- an irradiating process of irradiating the second recording layer with the laser light with the recording power set by said setting process.

6. An information recording medium comprising:
- recording layers in an order of a first recording layer and a second recording layer from an irradiation side of the laser light, and
- a management information area in which a ratio information which indicates a ratio between (ii-1) a first recording power of the laser light irradiated in the second recording layer, which is transmitted through an unrecorded area of the first recording layer, and (ii-2) a second recording power of the laser light irradiated in the second recording layer, which is transmitted through a recorded area of the first recording layer, is recorded.

7. The information recording medium according to claim 6, wherein the recording power is pulse intensity.

8. The information recording medium according to claim 6, wherein the management information area is in a lead-in area.

9. The information recording medium according to claim 6, wherein the ratio information is recorded in advance as pre-format information.

* * * * *

UNITED STATES PATENT AND TRADEMARK OFFICE
CERTIFICATE OF CORRECTION

| | | |
|---|---|---|
| PATENT NO. | : 7,636,282 B2 | Page 1 of 1 |
| APPLICATION NO. | : 10/573762 | |
| DATED | : December 22, 2009 | |
| INVENTOR(S) | : Muramatsu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Twenty-first Day of December, 2010

David J. Kappos
*Director of the United States Patent and Trademark Office*